US009165476B2

United States Patent
Yoshikawa et al.

(10) Patent No.: US 9,165,476 B2
(45) Date of Patent: Oct. 20, 2015

(54) PORTABLE PIANO KEYBOARD COMPUTER

(71) Applicants: Yoshinori Yoshikawa, Los Altos, CA (US); Keisuke Shingu, San Francisco, CA (US); Ryuichiro Kuzuryu, Sunnyvale, CA (US)

(72) Inventors: Yoshinori Yoshikawa, Los Altos, CA (US); Keisuke Shingu, San Francisco, CA (US); Ryuichiro Kuzuryu, Sunnyvale, CA (US)

(73) Assignee: Miselu, Inc., San Francisco, CA (US)

( * ) Notice: Subject to any disclaimer, the term of this patent is extended or adjusted under 35 U.S.C. 154(b) by 0 days.

(21) Appl. No.: 13/791,335

(22) Filed: Mar. 8, 2013

(65) Prior Publication Data
US 2014/0047970 A1    Feb. 20, 2014

Related U.S. Application Data

(60) Provisional application No. 61/609,196, filed on Mar. 9, 2012.

(51) Int. Cl.
| | | |
|---|---|---|
| *G10H 1/32* | (2006.01) | |
| *G10H 3/00* | (2006.01) | |
| *G09B 15/08* | (2006.01) | |
| *G10H 7/00* | (2006.01) | |

(52) U.S. Cl.
CPC . *G09B 15/08* (2013.01); *G10H 7/00* (2013.01)

(58) Field of Classification Search
CPC ...... G09B 15/08; G09B 15/04; G09B 15/003; G09B 15/006; A01B 12/006; G10H 7/00; G10H 1/0016; G10H 1/0008; G10H 2220/066
USPC .............................. 84/464 R, 464 A, 743, 744
See application file for complete search history.

(56) References Cited

U.S. PATENT DOCUMENTS

| | | | | |
|---|---|---|---|---|
| 5,886,273 | A * | 3/1999 | Haruyama | 84/478 |
| 6,008,783 | A * | 12/1999 | Kitagawa et al. | 345/39 |
| 6,025,550 | A * | 2/2000 | Kato | 84/464 A |
| 6,087,577 | A * | 7/2000 | Yahata et al. | 84/478 |
| 6,388,181 | B2 * | 5/2002 | Moe | 84/477 R |
| 6,410,836 | B2 * | 6/2002 | Takahashi | 84/478 |
| 6,821,203 | B2 * | 11/2004 | Suga et al. | 463/7 |
| 7,030,307 | B2 * | 4/2006 | Wedel | 84/477 R |
| 7,247,788 | B2 * | 7/2007 | Lai | 84/719 |
| 7,390,958 | B2 * | 6/2008 | Knudsen | 84/645 |
| 7,608,774 | B2 * | 10/2009 | Ohmura et al. | 84/470 R |
| 7,853,342 | B2 * | 12/2010 | Redmann | 700/94 |
| 8,445,767 | B2 * | 5/2013 | Brow et al. | 84/609 |
| 2008/0078281 | A1 * | 4/2008 | Katsuta | 84/609 |
| 2013/0068086 | A1 * | 3/2013 | Mittelstadt et al. | 84/645 |

OTHER PUBLICATIONS

"ION, Piano 2 Go, Portable Musical Keyboard for iPod, iPhone and iPad"; Ionaudio.com; 1 page.
Bell, Killian; http://www.macsessed.com/posts/visible-green-usb-cables-from-dexim-visuala-your-charging . . . Feb. 1, 2012; Visible Green USB Cables From Dexim Visualize Your Charging; 2 pages.

* cited by examiner

*Primary Examiner* — Jeffrey Donels
(74) *Attorney, Agent, or Firm* — Trellis IP Law Group, PC

(57) ABSTRACT

A piano keyboard computer includes a piano-type keyboard adjacent to a display screen. The system allows music tutorials, visualizations and other applications. A docking system allows additional devices to be placed on, adjacent to, or near the piano keyboard computer. The additional device then communicates with the piano keyboard computer to add functionality such as additional speakers, controllers, etc. The piano keyboard computer can act as a controller for other devices.

15 Claims, 48 Drawing Sheets

Figure 8
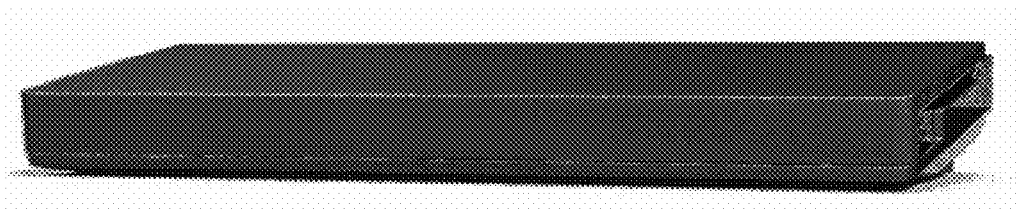
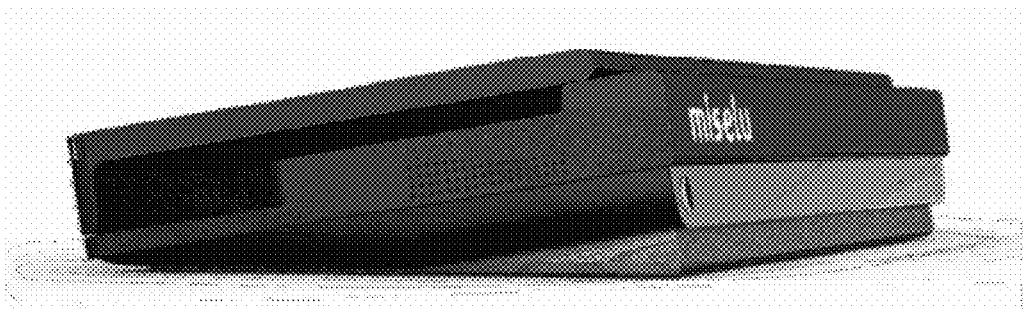

Figure 23
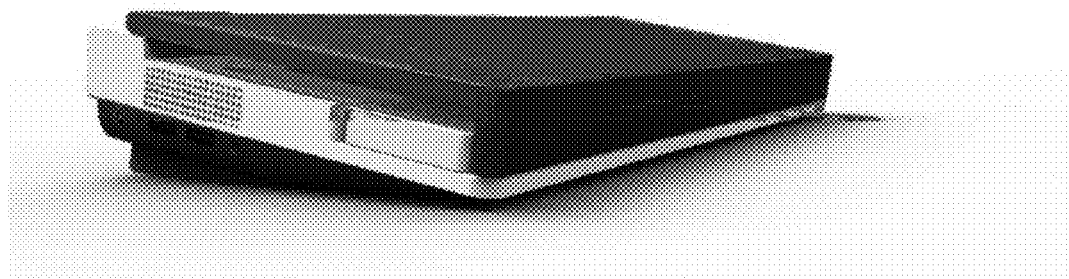
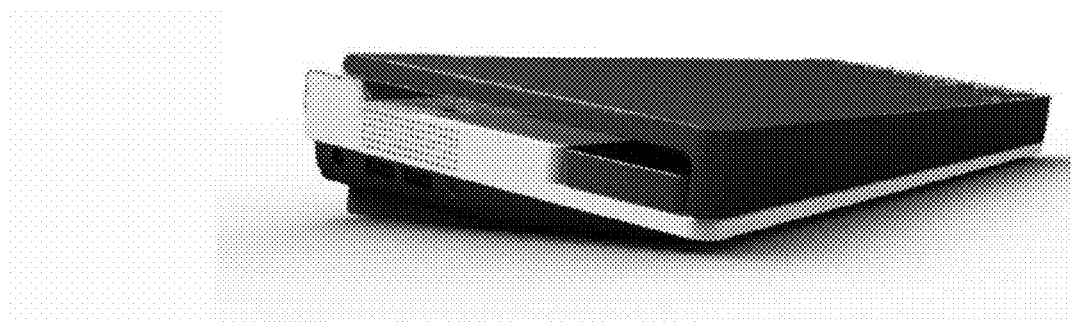

Even hole speaker perf pattern

Staggered hole speaker perf pattern

Staggered hole speaker perf pattern

Circular hole speaker port pattern

1. Overview

Timer Callback V1 Alpha

2. Function List msl_ClientOpen()
msl_ProcessCallback()
msl_PortRegister()
msl_Activiate()
msl_ClientClose()
msl_RevMIDICallback()
msl_SendMidiLongMessage()
msl_SendMidiShortMessage()

3. Typedef
typedef int (*mslProcessCallback) (int frames, void *data);
typedef int (*mslRevMidiCallback) (msl_port_t * port, unit8_t* midi_data, int length)

Figure 37

4. Functions msl_ClientOpen

| | |
|---|---|
| ═══ | msl_client_t* msl_ClientOpen ( const char* client_name) |
| ═══ | Sound ═══════════════════════ |
| ═══ | client_name ═══════════════ |
| ═══ | ═══════════════════════════ |
| | NULL: ═══ | msl_ProcessCallback

| | |
|---|---|
| ═══ | int msl_ProcessCallback (msl_client_t* client, MslProcessCallback* callback_func) |
| ═══ | Audio Rendering ═══════════ |
| ═══ | client ═══════════════════ |
| | callback_func ═══════════ |
| ═══ | NULL: ═══ |
| | NULL: ═══════ | msl_PortRegister

| | | |
|---|---|---|
| ═══ | msl_port_t* msl_PortRegister (msl_client_t* client, const char* name, int type, int direction) | |
| ═══ | MIDI Port   Audio Port ═══ | |
| ═══ | client ═══════════ | |
| | name ═══════════ | |
| | type | MslPortTypeAudio   Audio<br>MslPortTypeMidiNsx   NSX   Midi ═══<br>MslPortTypeMidiKeyBoard   Midi ═══ |
| | direction | MslPortIsInput ═══<br>MslPortIsOutput ═══ |
| ═══ | ═══ ═══════ | |
| | NULL: ═══ | | msl_Activate

| | |
|---|---|
| ═══ | int msl_Activate (msl_client_t *client) |

Figure 38

| | | | |
|---|---|---|---|
| === | MIDI,Audio Callback | === | |
| === | client | === | |
| === | NULL: | === | |
| | NULL: | === | | msl_ClientClose

| | | |
|---|---|---|
| === | int msl_ClientClose (msl_client_t *client) | |
| === | Sound | === |
| === | client | === |
| === | NULL: | === |
| | NULL: | === | msl_RcvMidiCallback

| | | |
|---|---|---|
| === | int msl_RcvMidiCallback (msl_client_t *client, MslRvcMidiCallBack* callback_func) | |
| === | MIDI | === |
| === | client | === |
| | callback_func | === |
| | rawdata | |
| === | NULL: | === |
| | NULL: | === | msl_sendMidiLongMessage

| | | |
|---|---|---|
| === | int msl_SendMidiLongMessage (msl_client_t *client, msl_port_t* port ,unit8_t* midi_data, int length) | |
| === | MIDI | Exclusive Message |
| === | client | === |
| | port | === |
| | midi_data | === === |
| | length | === === |
| === | NULL: | === |
| | NULL: | === | msl_sendMidiShortMessage

Figure 39

| | int msl_SendMidiShortMessage (msl_client_t *client, msl_port_t* port unit32_t midi_data) |  |  |
|---|---|---|---|
| | ≡≡≡ MIDI ≡≡≡ | | |
| | client | ≡≡≡ | |
| | port | MIDI ≡≡≡ Port | |
| | midi_data | LSB ≡≡≡ | MIDI ≡≡ |
| | NULL:≡ | | |
| | NULL:≡≡ | | |

5. CallbackFunction

| | typedef int (*MalProcessCallback) (int nframes, void *data); | | |
|---|---|---|---|
| | Rendering ≡≡≡ | | |
| | nframes | Rendering≡≡ | |
| | data | ≡≡ Audio ≡≡ Buffer ≡≡ | |
| | NULL:≡ | | |
| | NULL:≡≡ | | |

| | typedef int (*MalRcvMidiCallback) ( msl_port_t* port, unit8_t* midi_data), int length) | |
|---|---|---|
| | Midi ≡≡≡ | |
| | port | ≡≡≡ |
| | midi_data | MIDI ≡≡≡ |
| | length | ≡ MIDI Data ≡ |
| | NULL:≡ | |
| | NULL:≡≡ | |

6. Pending Item
- Timer Callback
- MIDI Timestamp
- 
- USB MIDI, USB Audio

Classic Play Mode
Original Scoped Mode

Figure 43
SOCIAL MODE

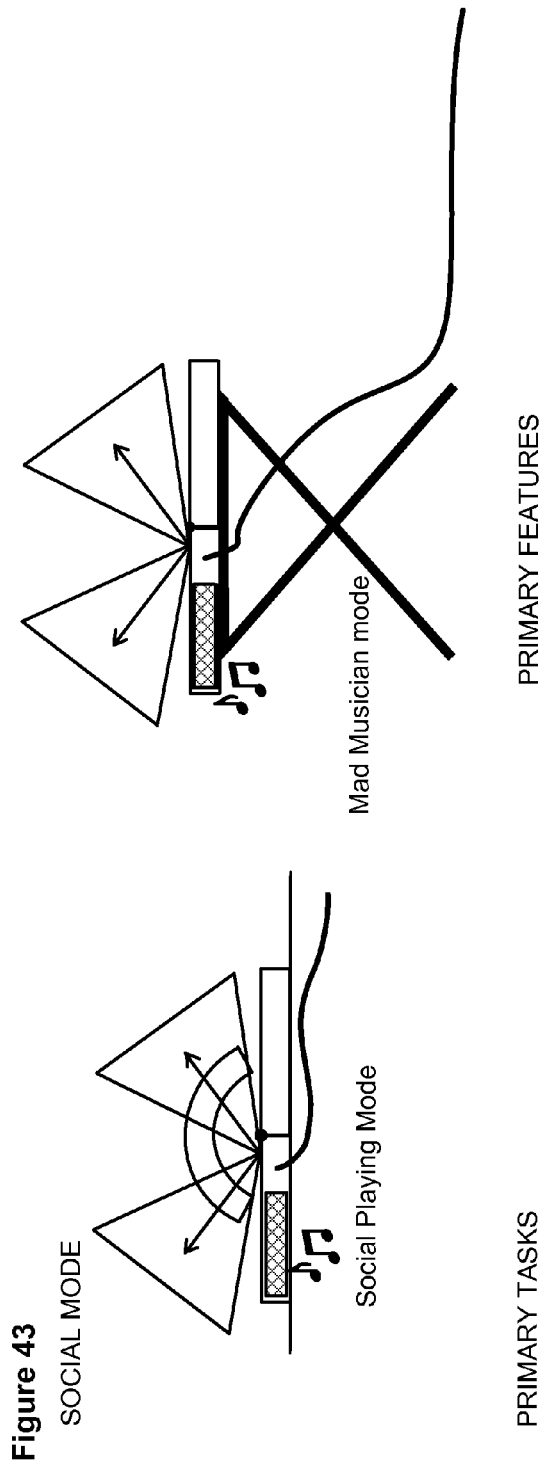

PRIMARY TASKS

1. Playing together (duet)
2. Band of Foogees in one room
3. Gaming (compete)
4. Live Musician (play both physical KB and interface with custom apps)
5. Expressing (composing)
6. Sharing

CHALLENGES

1. Connector location
2. Matching display right against keys (accommodate Mirror/Mapping feature)
3. Speaker location for loud sound
4. Camera angle is not very flattering > under nose angle

PRIMARY FEATURES 1. 180 degree open display
2. Mirror/Mapping Feature (Display right against Keys)
3. Wide Angle Lenses for both Cameras (Capturing both Players)
4. High Quality sound verses loud >>> Social Mode drives connector location

TABLET MODE

Figure 45

TABLET MODE (secondary or tertiary mode)

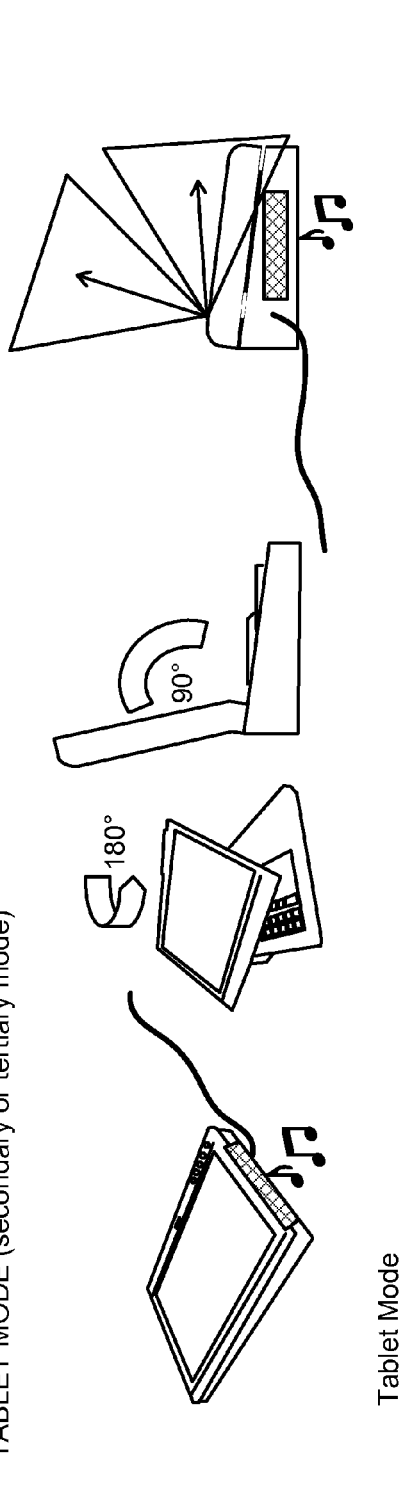

Tablet Mode

PRIMARY TASKS

1. Sharing (upload to Facebook)
2. Purchasing (buy new scores & apps, discover music)
3. Archiving
4. Standard Tablet Functions (email)

CHALLENGES

1. Complex hinging or sliding mechanism
2. Speaker location?
3. If sliding mech, cover is needed.
4. High off the table, comfortable?

PRIMARY FEATURES

1. Tablet Functions (digital keyboard, browsing internet)
2. Descent quality sound
3. Cameras are accessible, but under chin view >>> Tablet Mode drives possible speaker location

Figure 46

Additional configuration | TABLET + DISPLAY

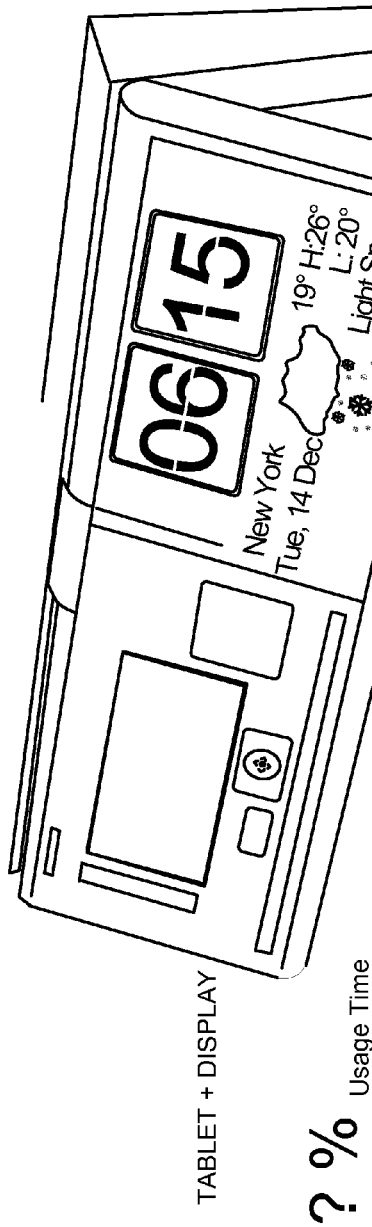

TABLET + DISPLAY

? % Usage Time

PRIMARY TASKS

1. Passive consumption (listening to Pandora, streaming content)

PRIMARY FEATURES

1. TV like viewing/consumption of content

CONSIDERATIONS

1. May be difficult to fold device into this configuration.

2. Mode promotes passive consumption, is this desirable?

3. Sound desirable? What kind of quality?

HARDWARE FEATURE PRIORTIZATION

PORTABLE PIANO KEYBOARD COMPUTER

CROSS REFERENCES TO RELATED APPLICATIONS

This application claims priority from U.S. Provisional Patent Application Ser. No. 61/609,196, entitled "Portable Piano Keyboard Computer", filed on Mar. 9, 2012, which is hereby incorporated by reference as if set forth in full in this application for all purposes.

FIELD OF THE INVENTION

This application is related in general to computer systems and more specifically to a computer system that uses a piano-type keyboard and display screen along with additional controls to provide music related applications, utilities and other functionality.

BRIEF DESCRIPTION OF THE FIGURES

FIGS. 3-11 illustrate a piano keyboard with associated display screen.

FIGS. 23-27 show the speaker dock in various low profile configurations

FIGS. 36-39 show example music SDK V1 API specifications

FIGS. 40-48 illustrate various usage scenarios and corresponding system configurations.

DESCRIPTION OF EMBODIMENTS

A portable computing system that includes a piano-style keyboard provides a system platform for musical applications. In a music tutorial application, a user follows the display of written musical notes as the music is played and each played note is indicated at a first tempo. A visual indicator above each key is turned on when that particular key should be played in order to play along with the progressing music. When the user sees the visual indicator then the user should press the key in order to play a correct note. A tempo or speed controller is provided so that the user can adjust the playback faster or slower in order to have less or more time to select the proper piano key to press.

In a particular embodiment, the tempo controller is a dedicated physical slider at the left side of the piano keyboard. In other embodiments a different dedicated controller can be used. Or the tempo controller can be a soft controller that is displayed on a display screen. The soft controller can be manipulated with a touchscreen, touchpad; mouse, trackball, pointing stick or other pointing device, voice commands, etc.

Figure 1:
FIG. 1 illustrates a piano keyboard with associated display screen.
Figure 2:
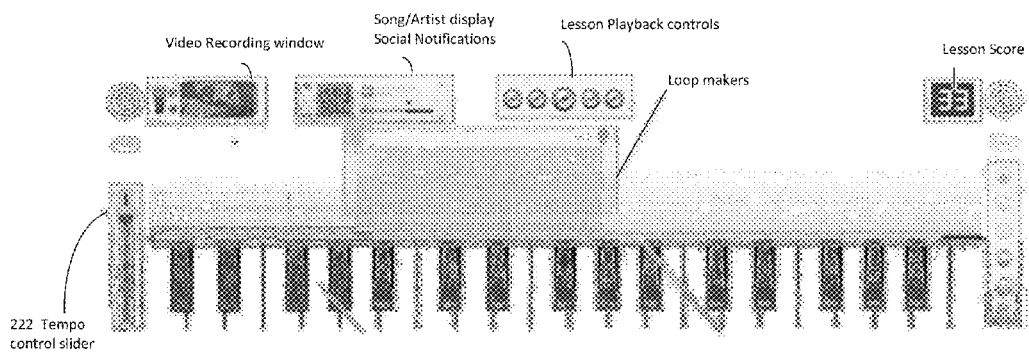
FIG. 2 shows a display screen overlaying the keys.
Figure 3:
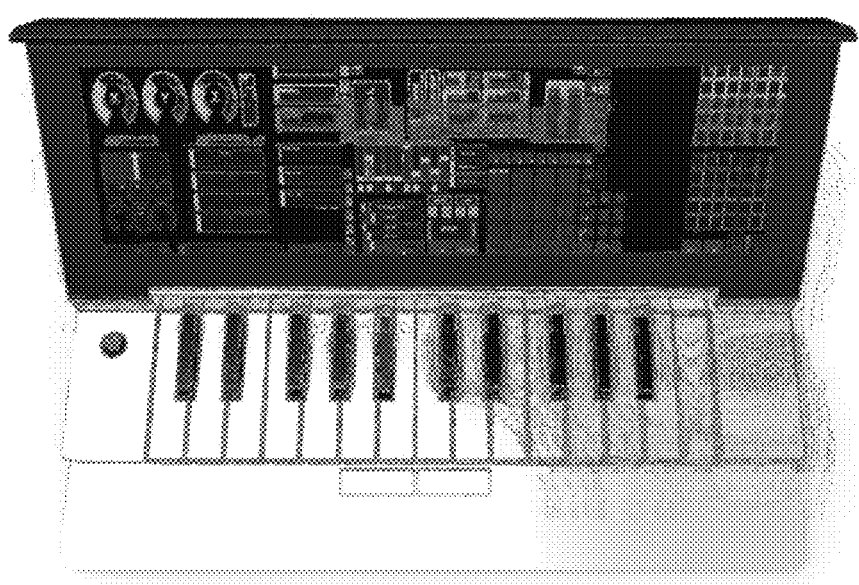
Figure 4:
Figure 5:
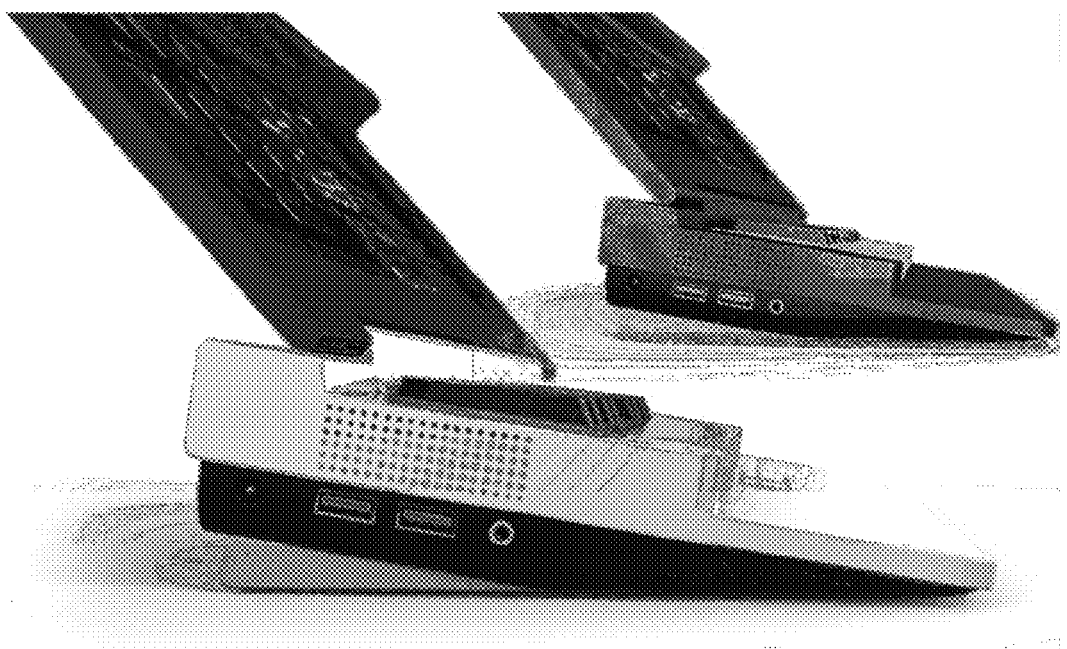
Figure 6:
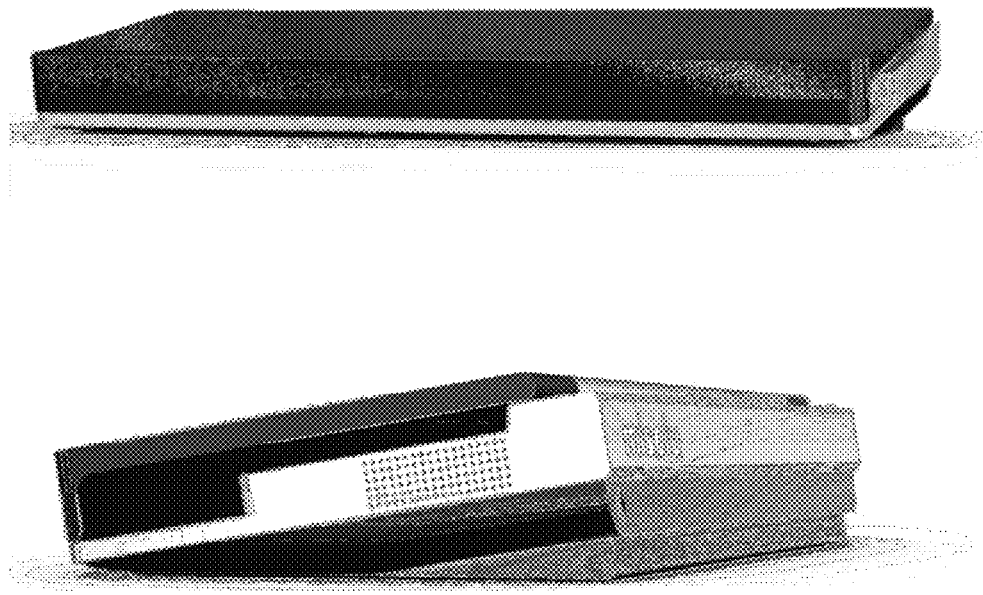
Figure 7:
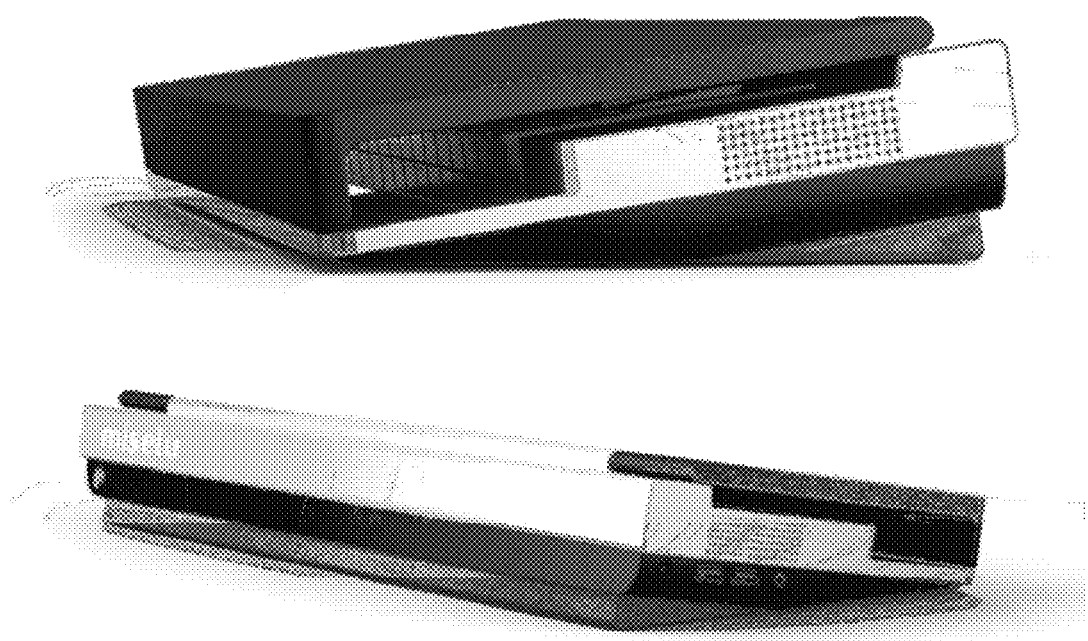
Figure 9:
Figure 10:
Figure 11:
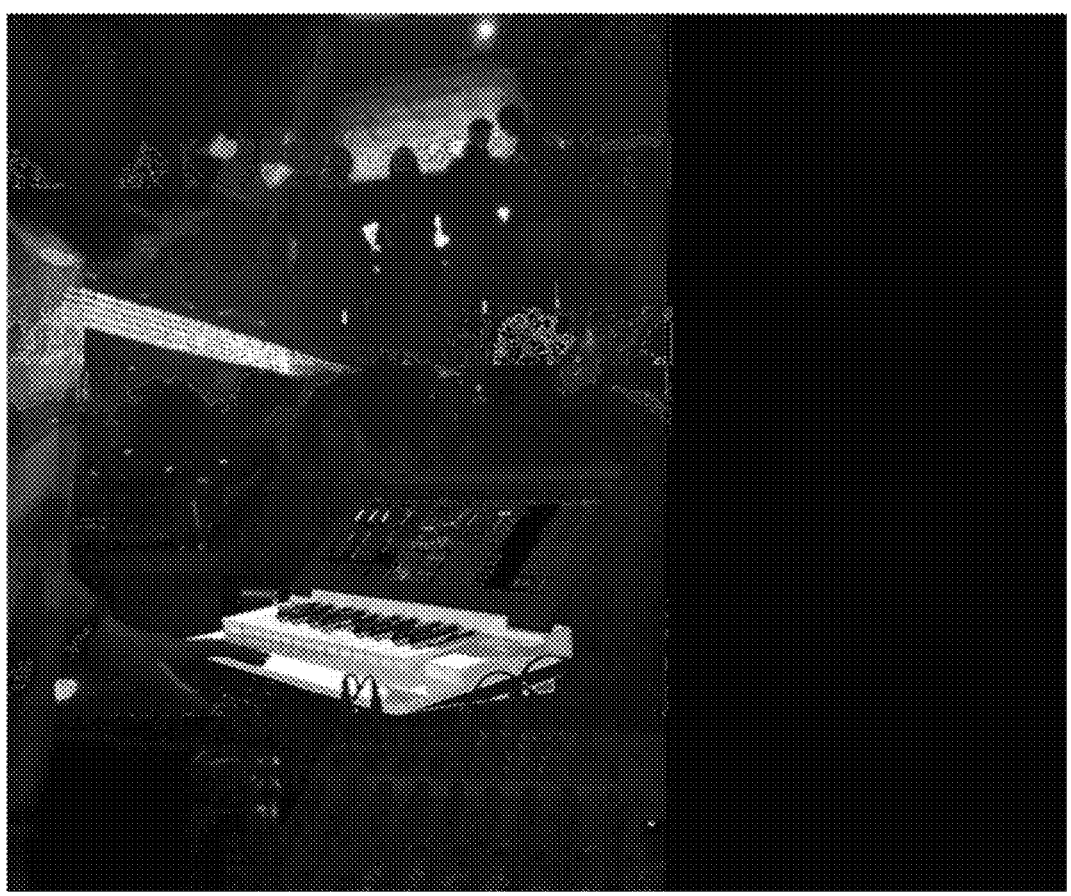
Figure 12:
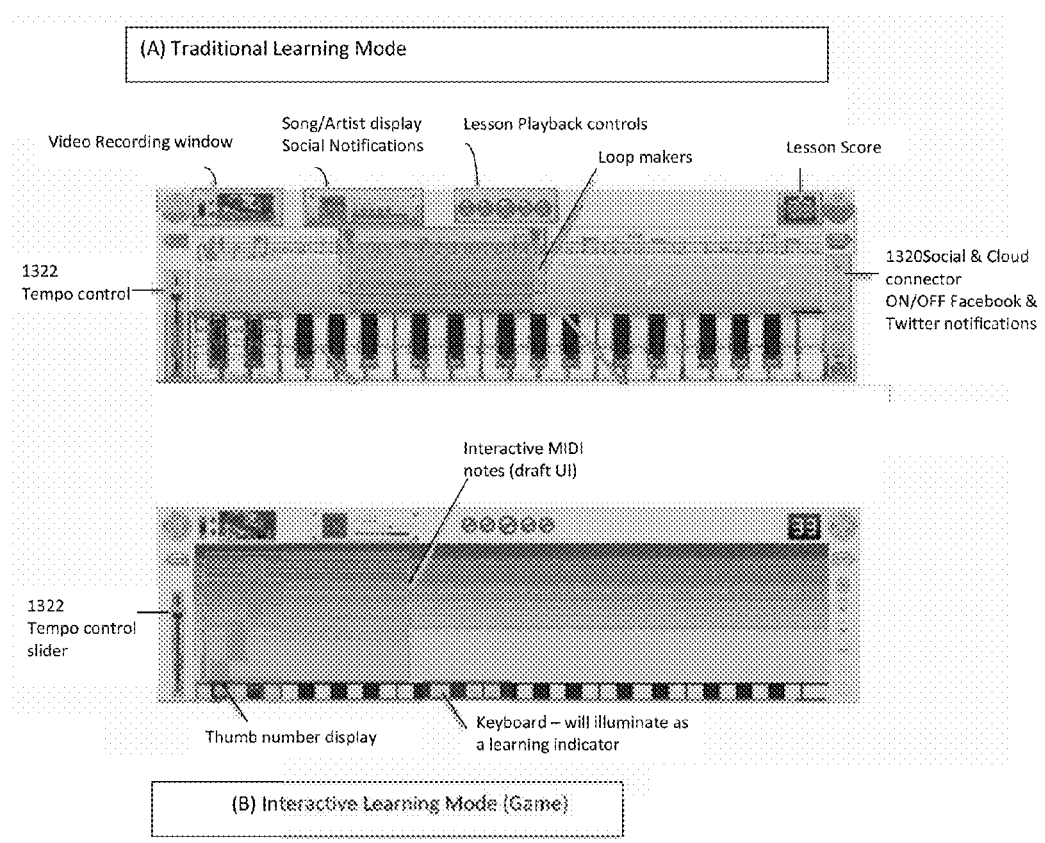
FIG. 12 shows a display screen overlaying the keys in two different modes.
Figure 13:
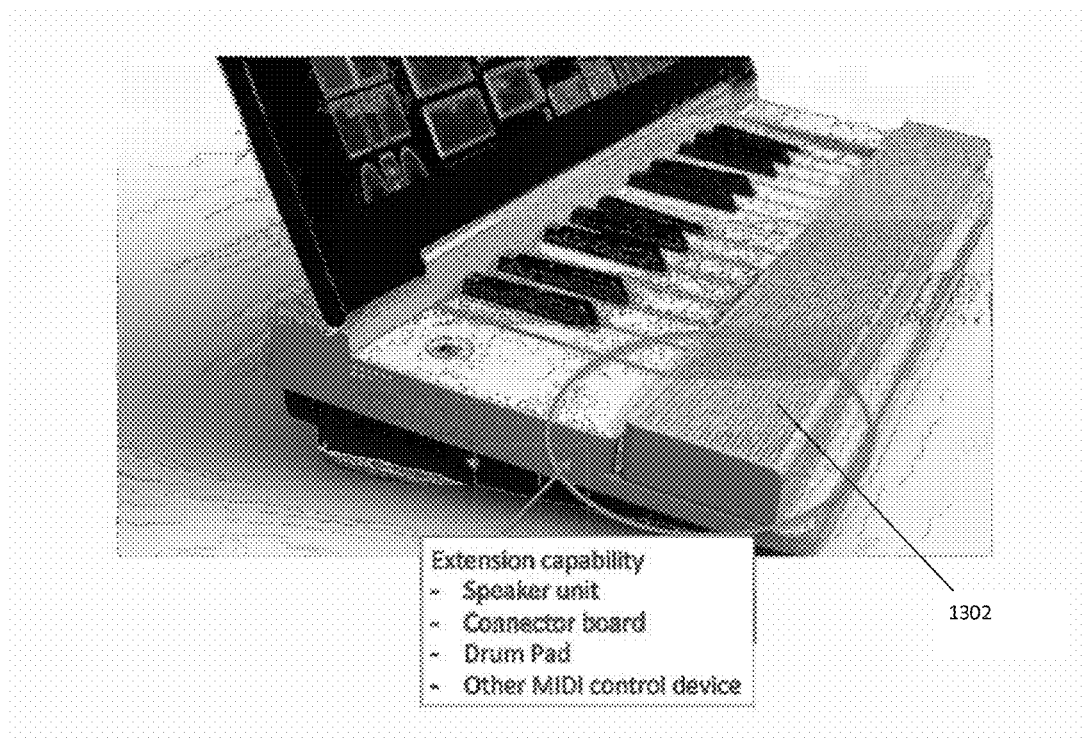
FIGS. 13-14 show how a speaker and associated functionality may be included.
Figure 14:
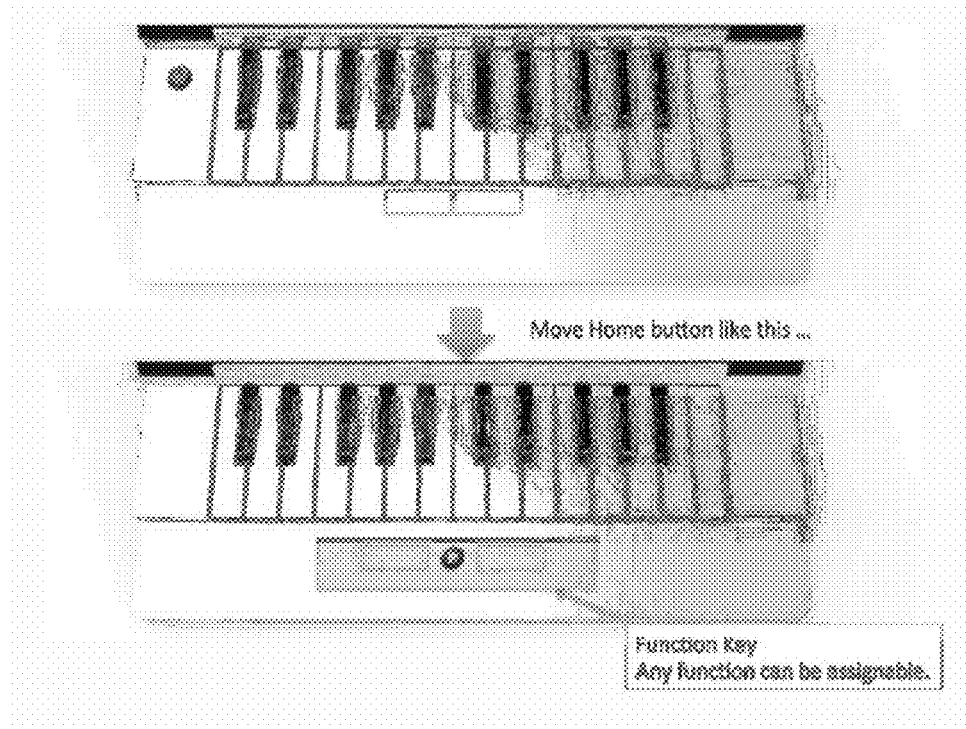
Figure 15:
FIG. 15 shows one usage scenario.
Figure 16:
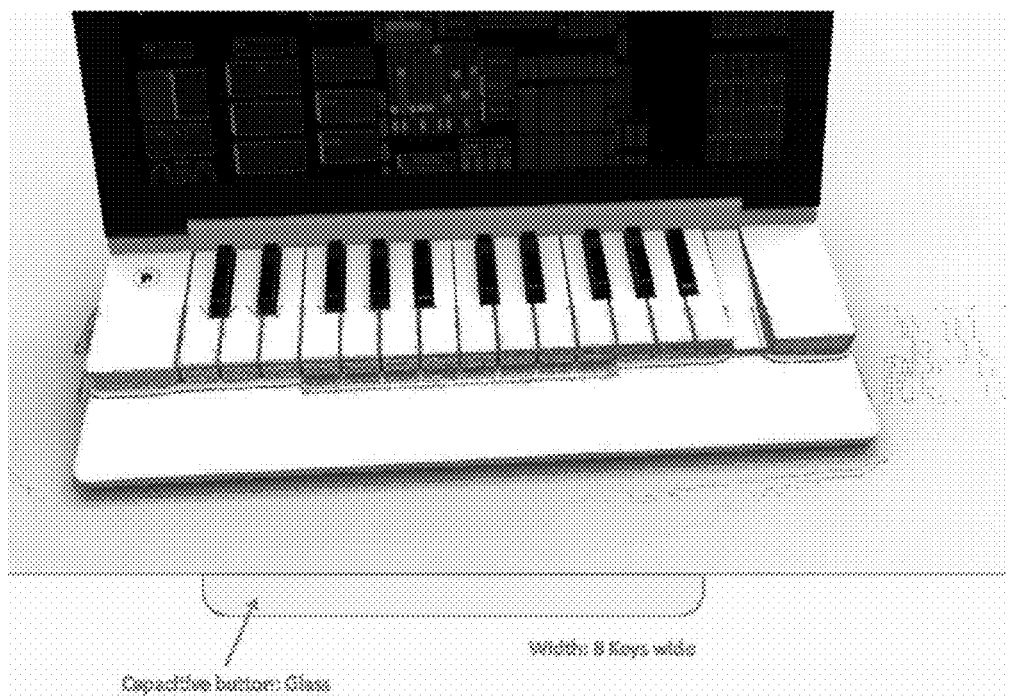
FIGS. 16-22 show function keys for Half Island or Full Island configurations
Figure 17:
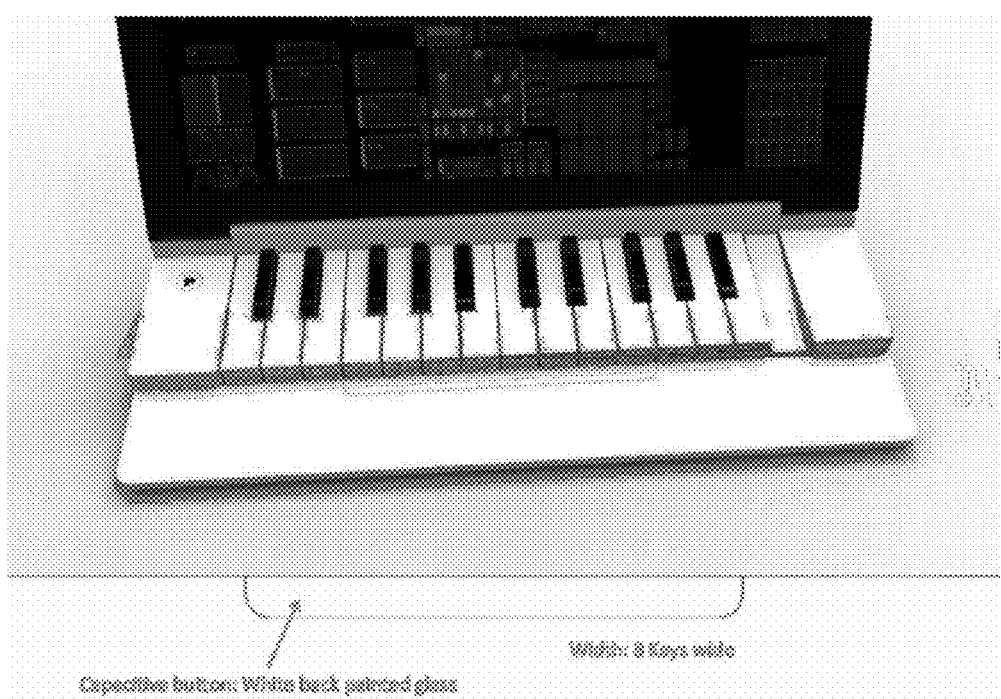
Figure 18:
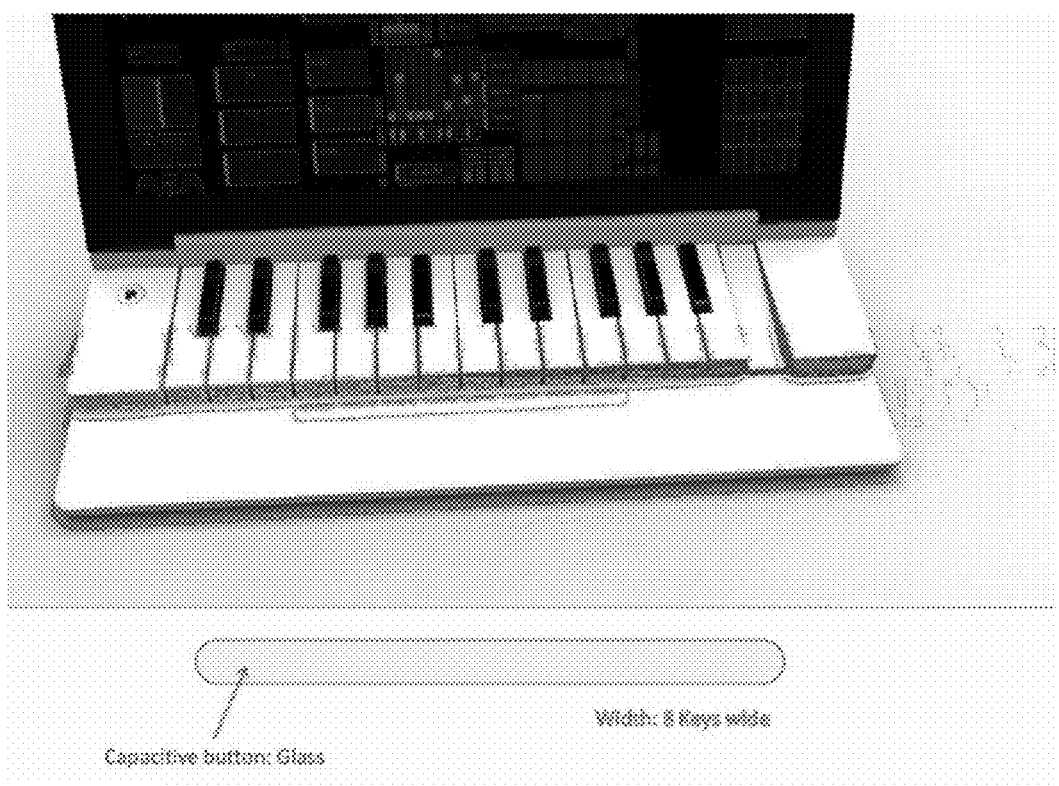
Figure 19:
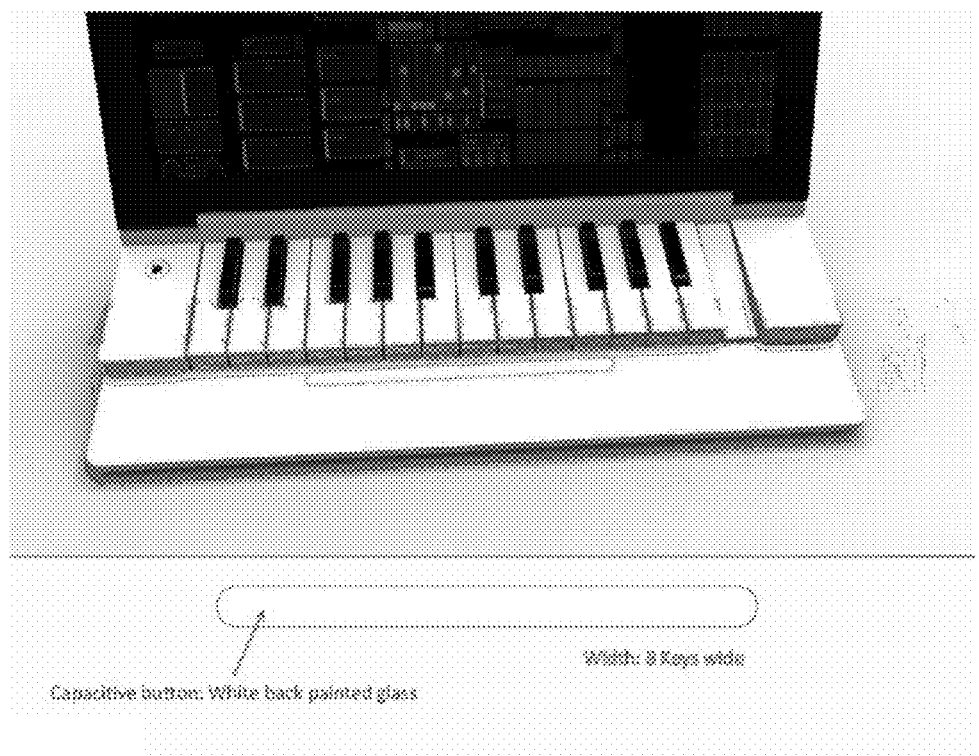
Figure 20:
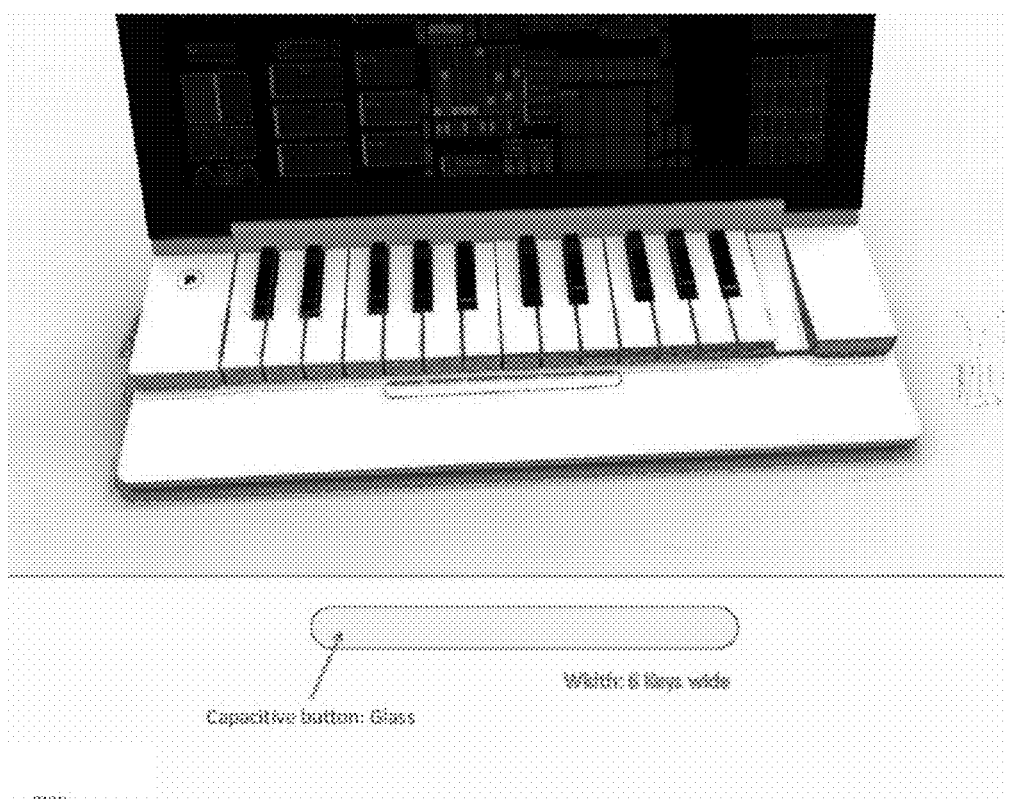
Figure 21:
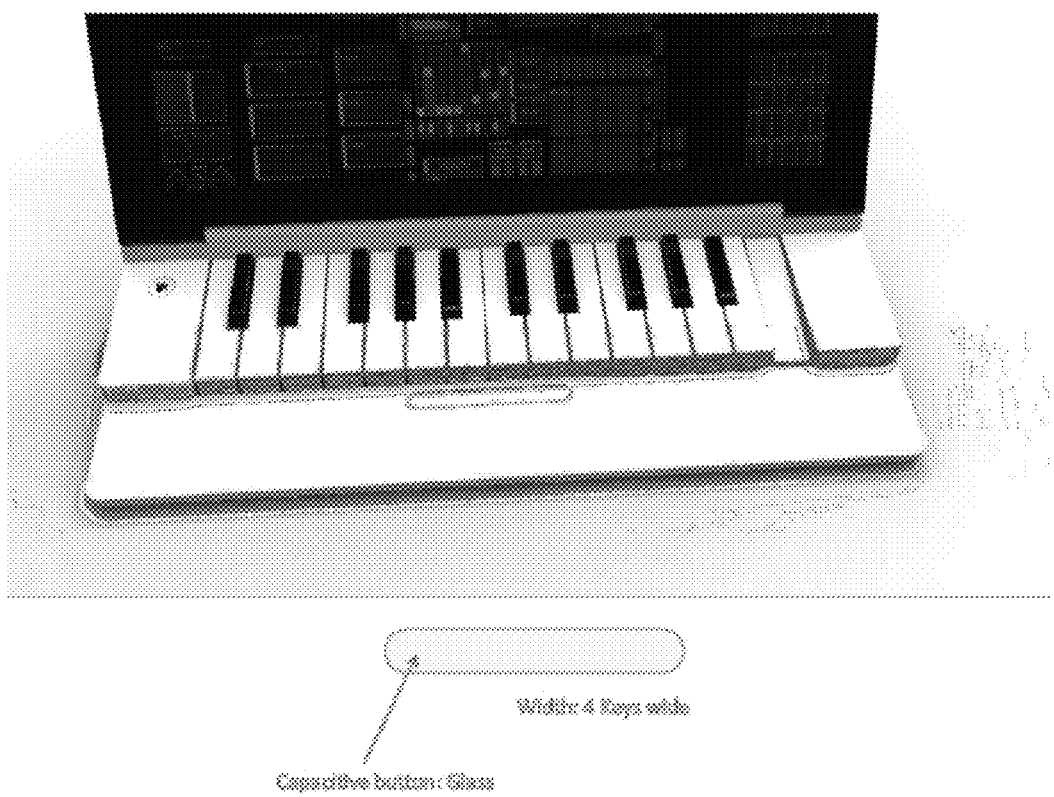
Figure 22:
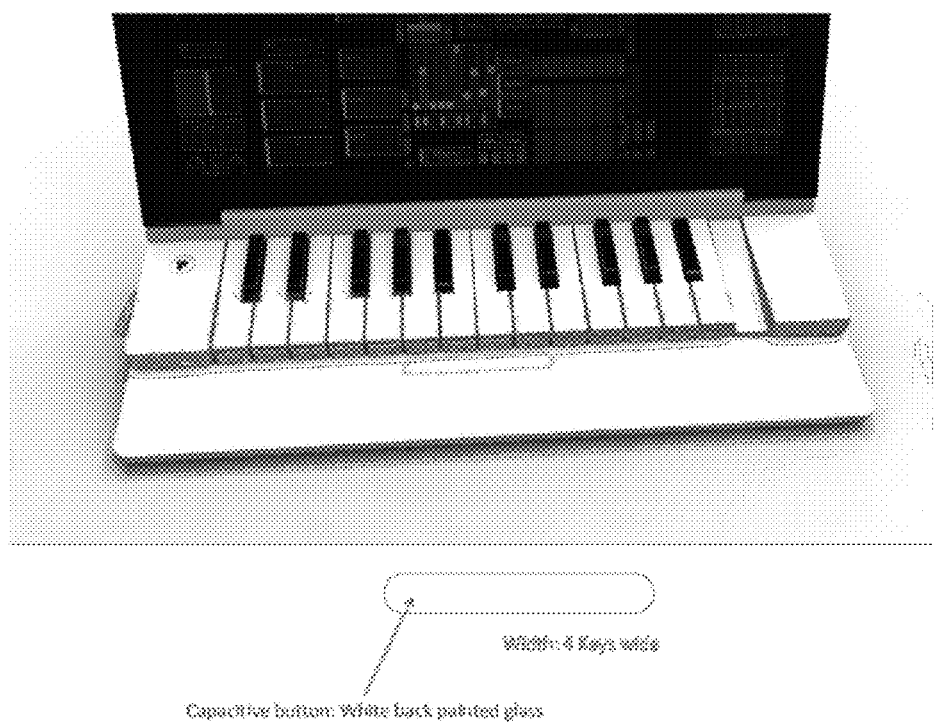
Figure 24:
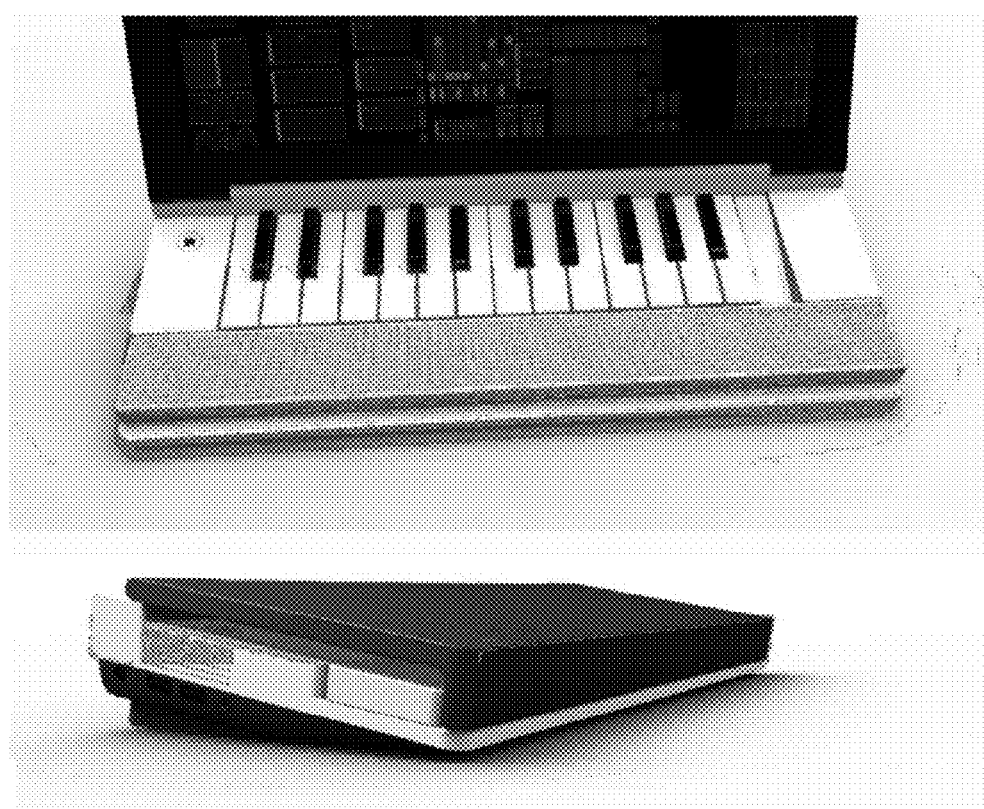
Figure 25:
Figure 26:
Figure 27:
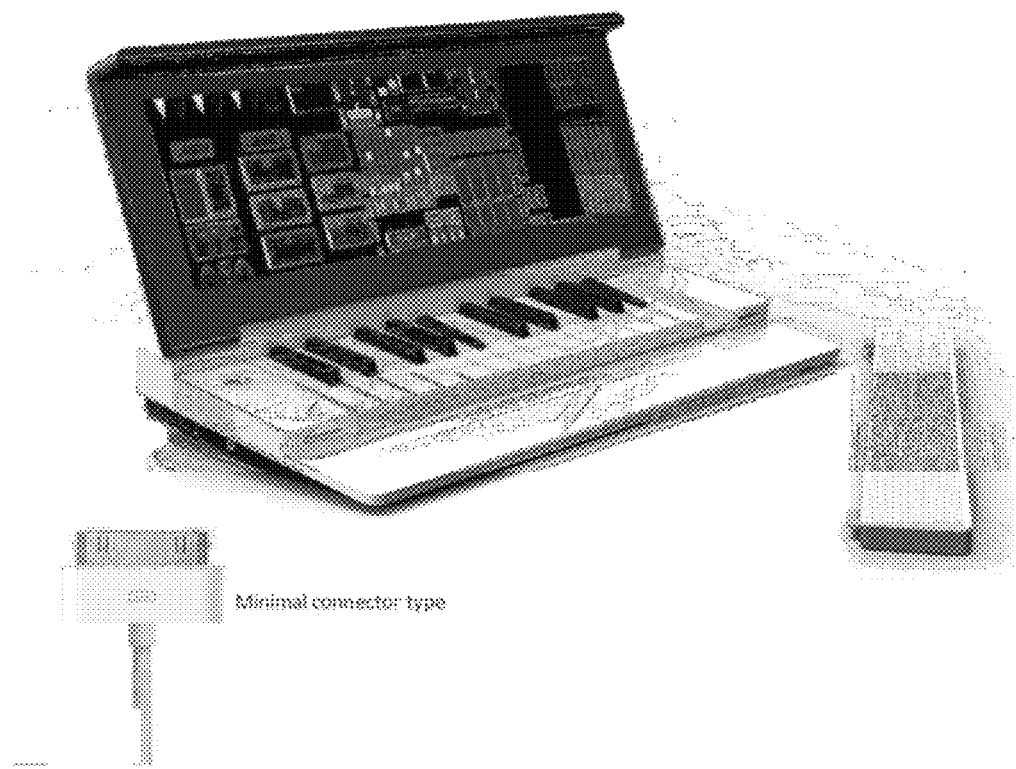
Figure 28:
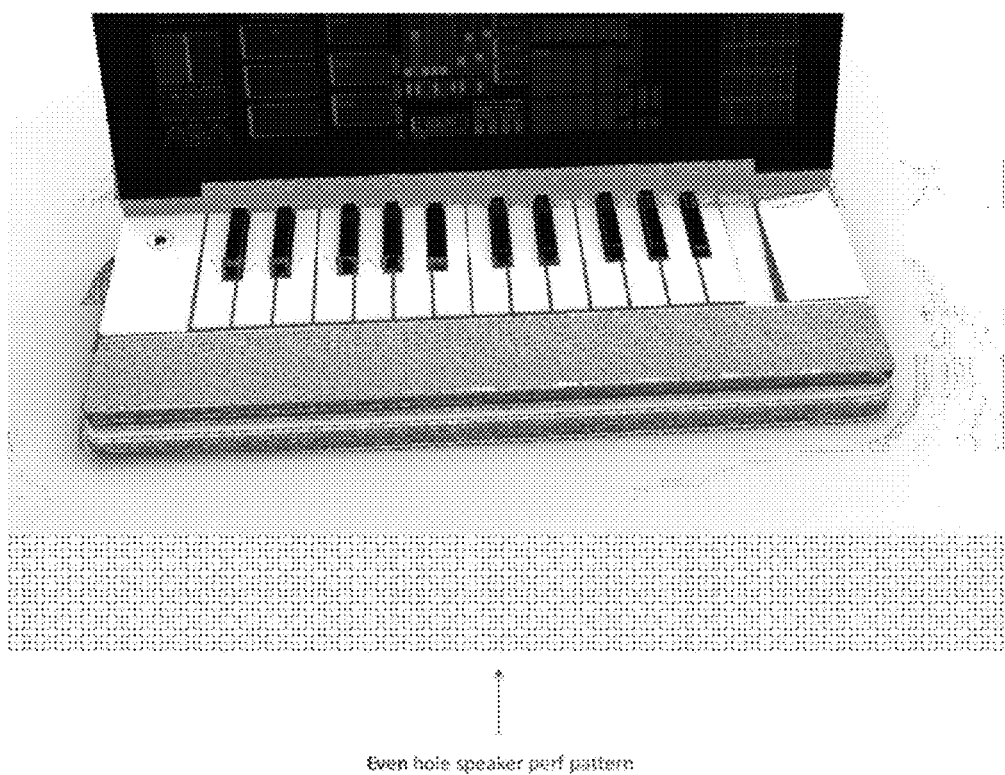
FIGS. 28-31 illustrate perforations patterns for the speaker dock
Figure 29:
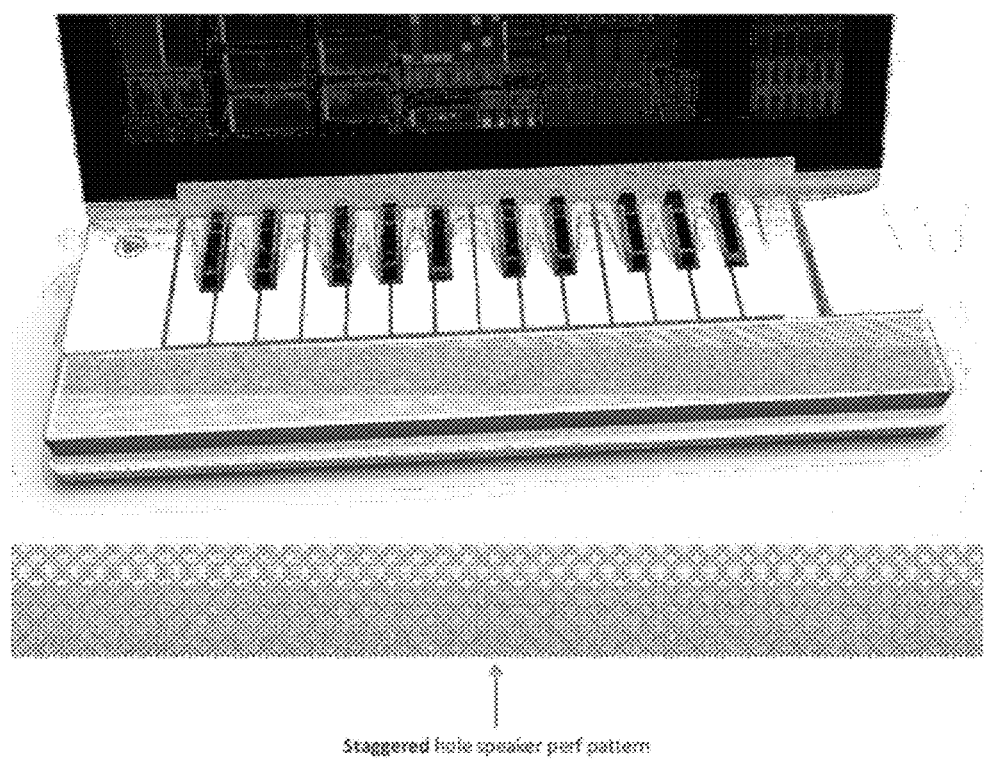
Figure 30:
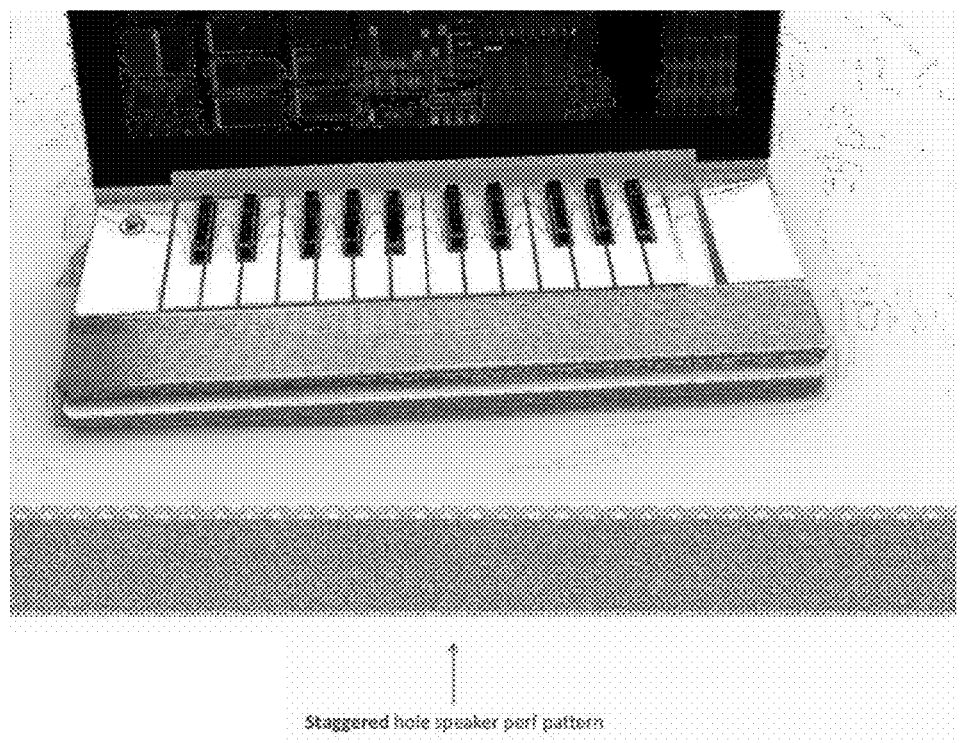
Figure 31:
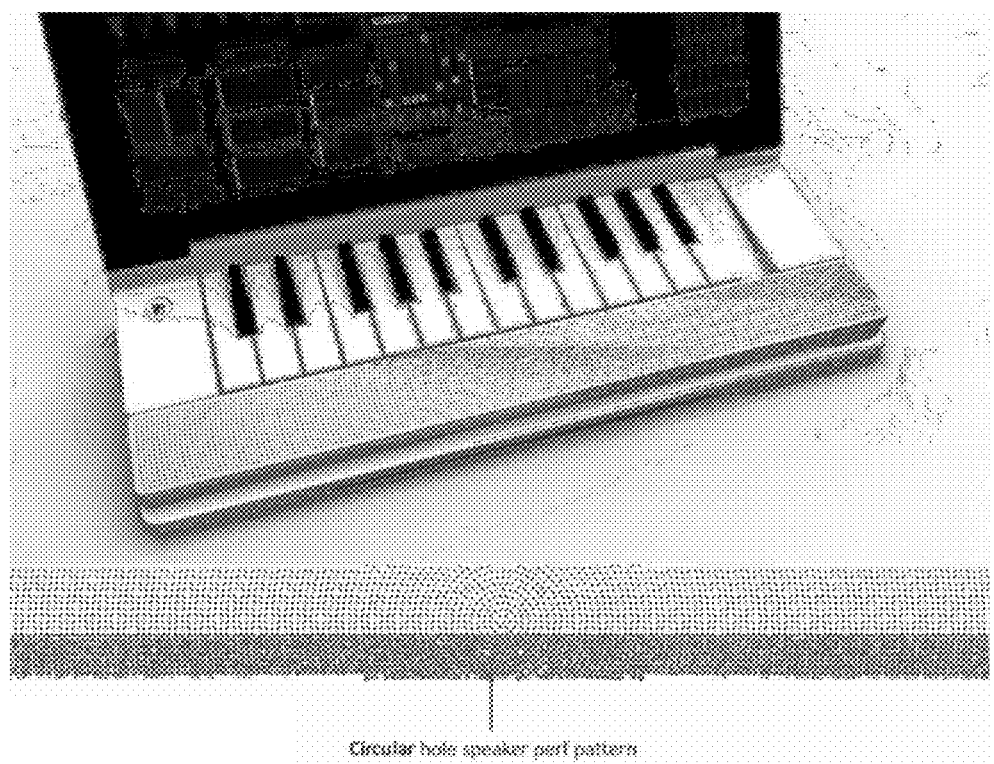
Figure 32:
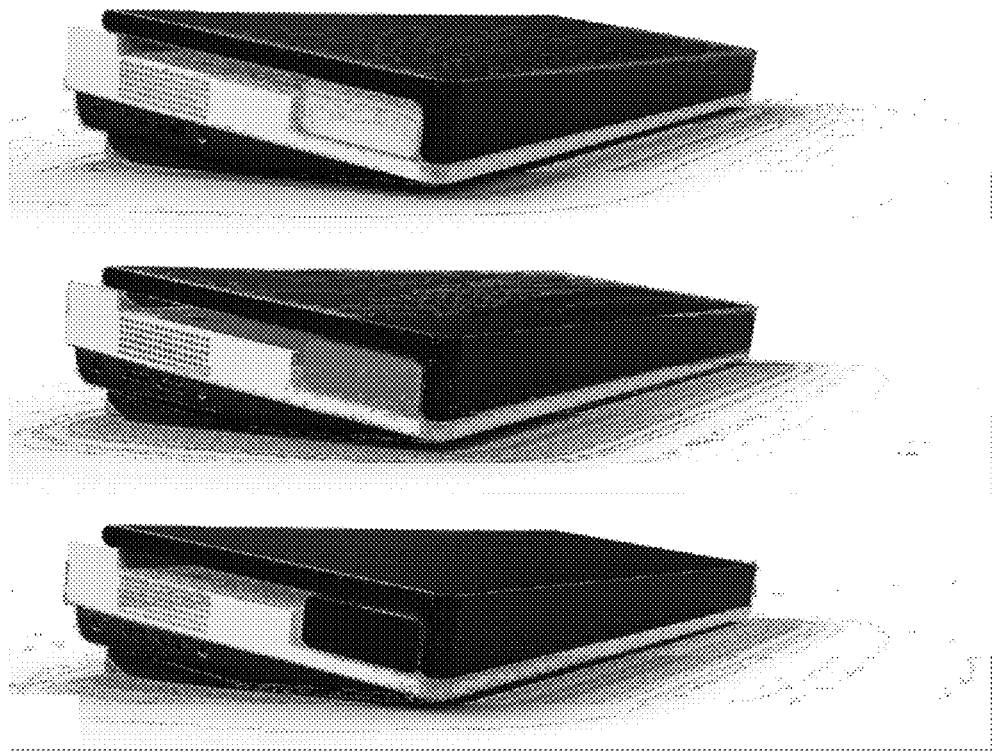
FIGS. 32-35 show the speaker dock in various high profile configurations
Figure 33:
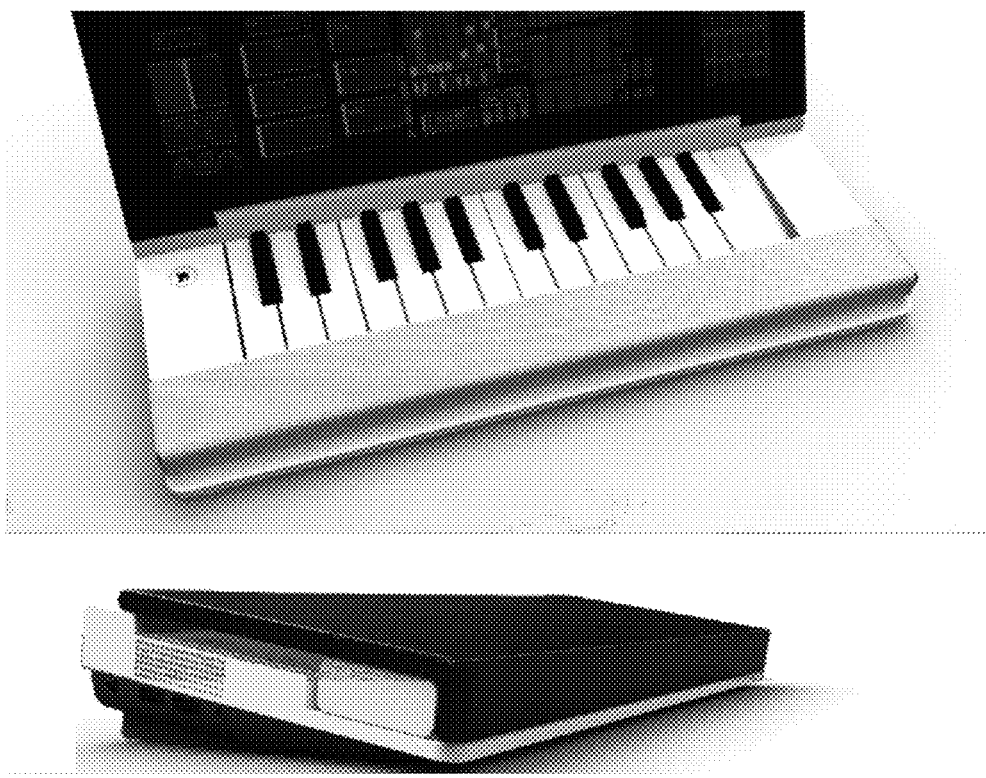
Figure 34:
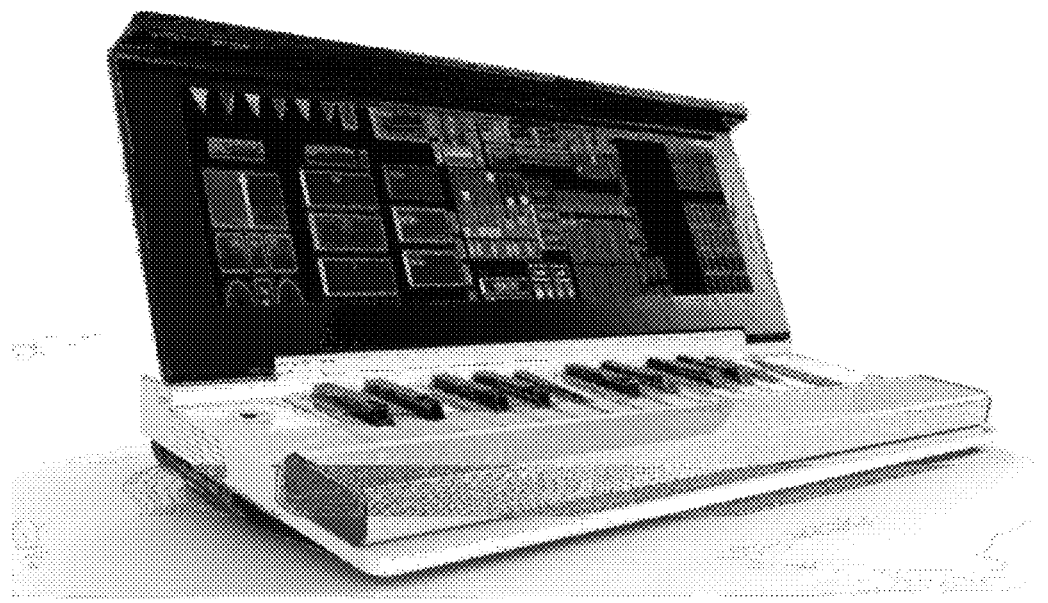
Figure 35:
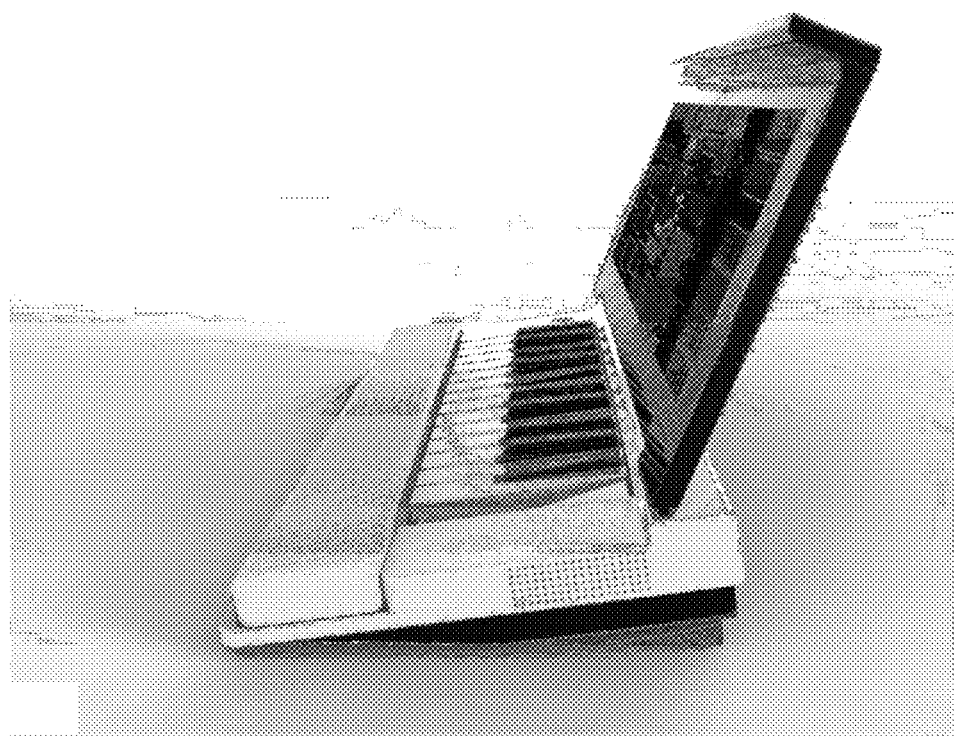
Figure 36:
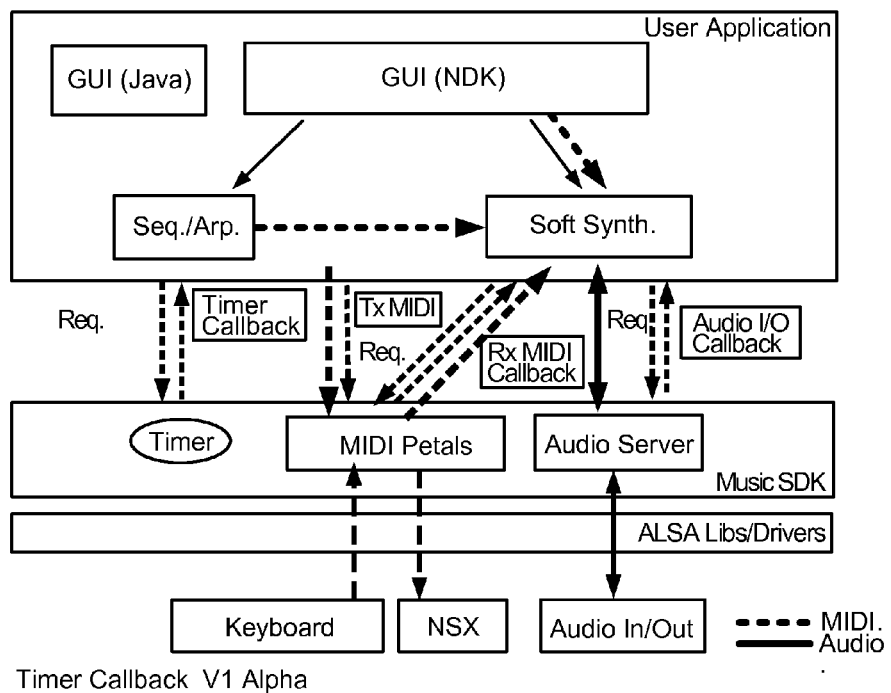
Figure 40:
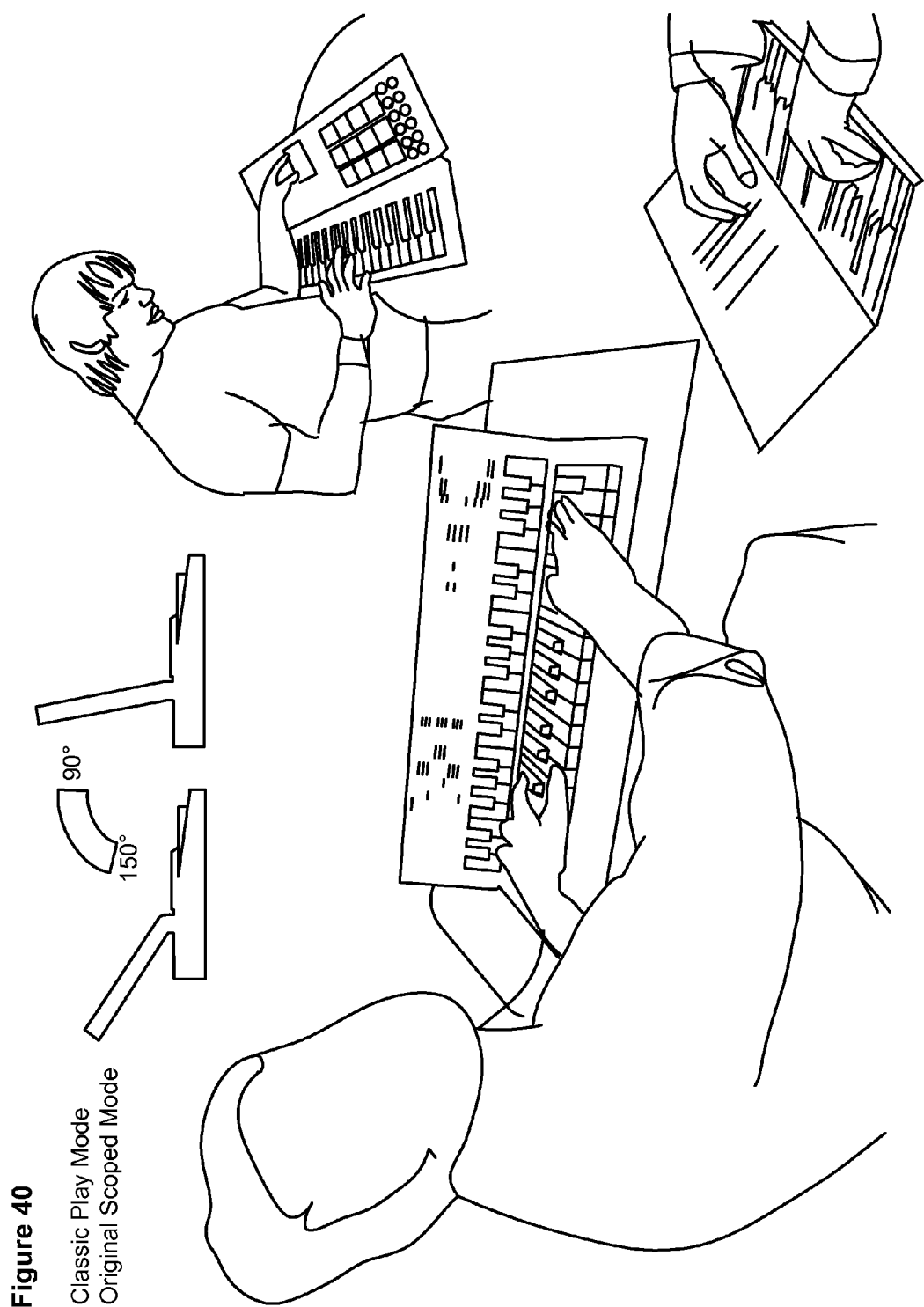
Figure 41:
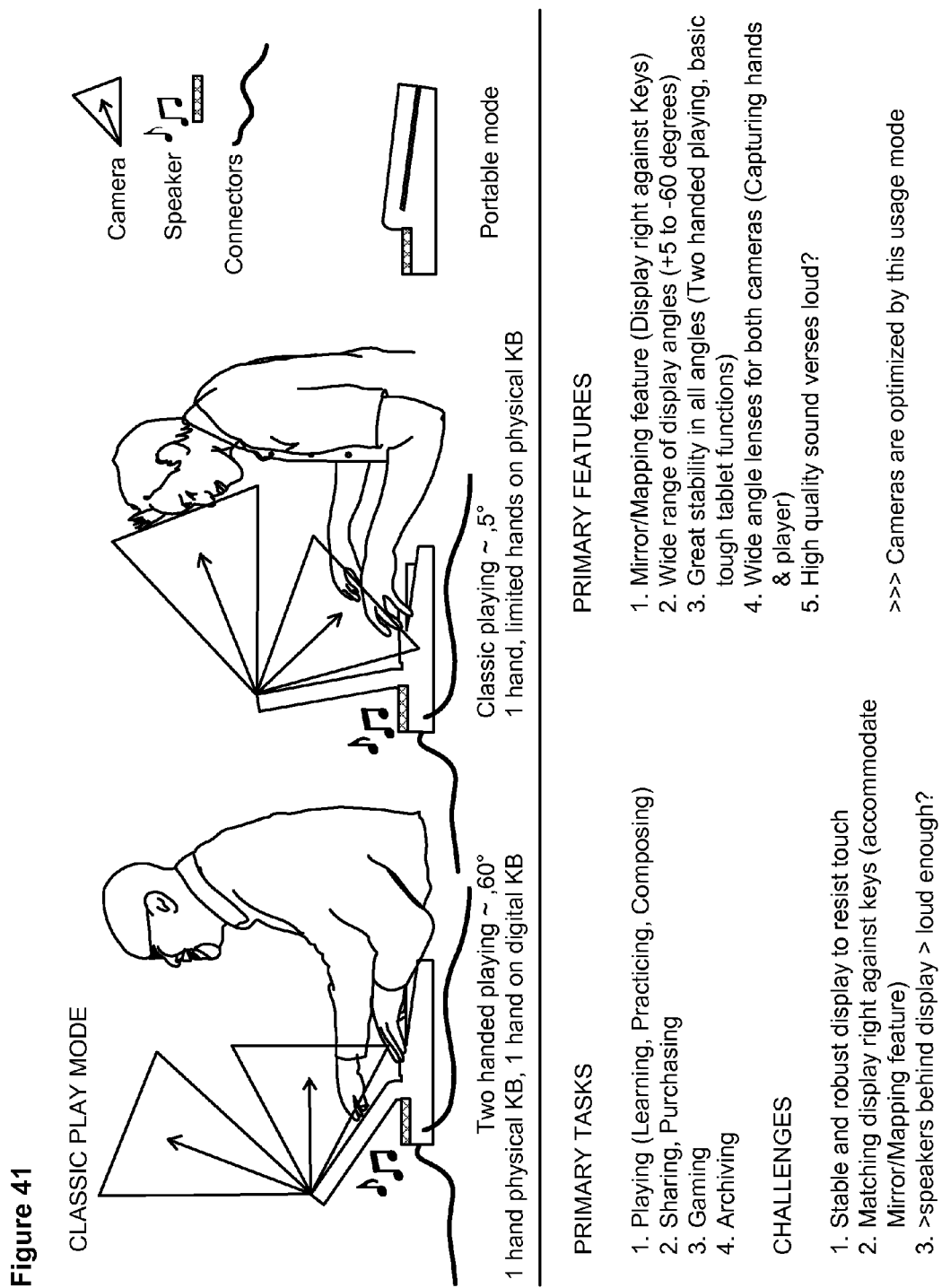
Figure 42:
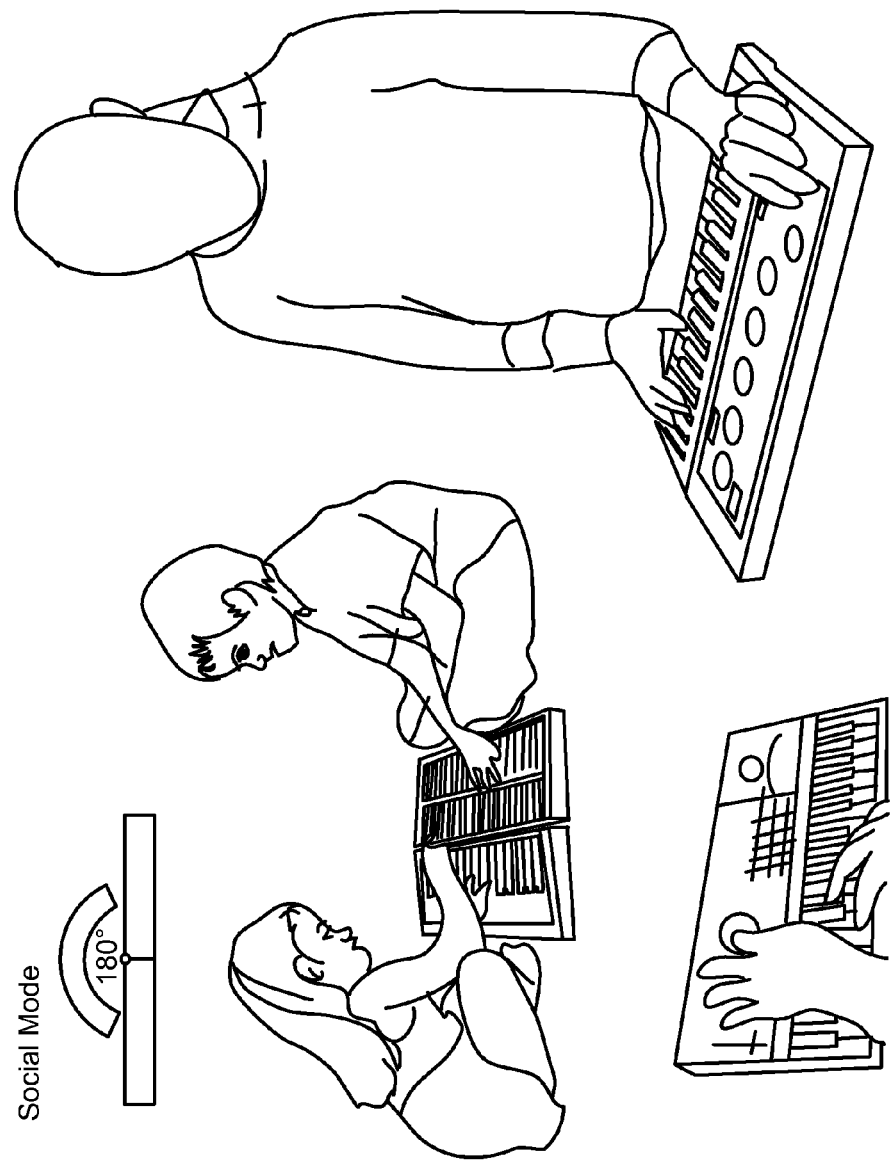
Figure 44:
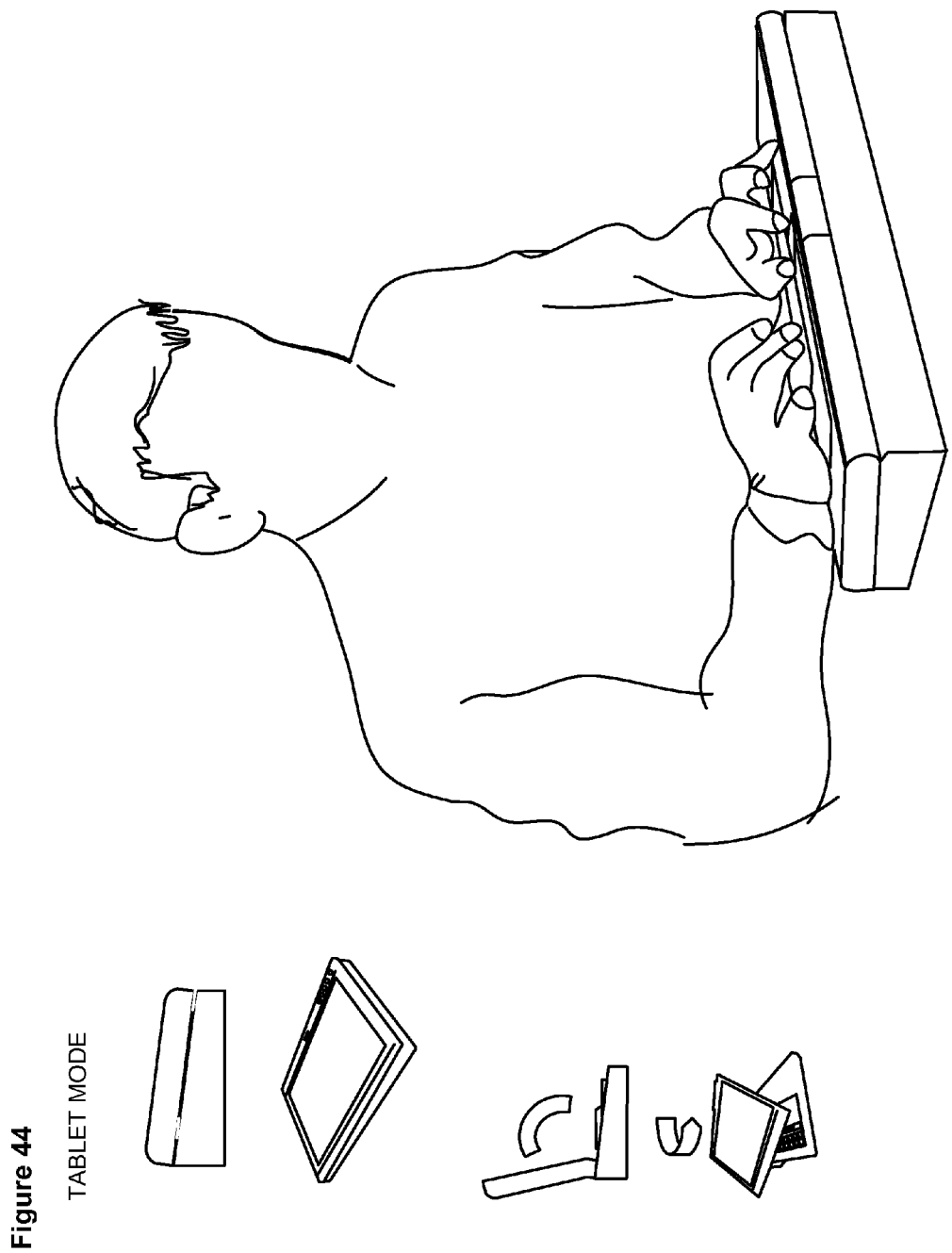
Figure 47:
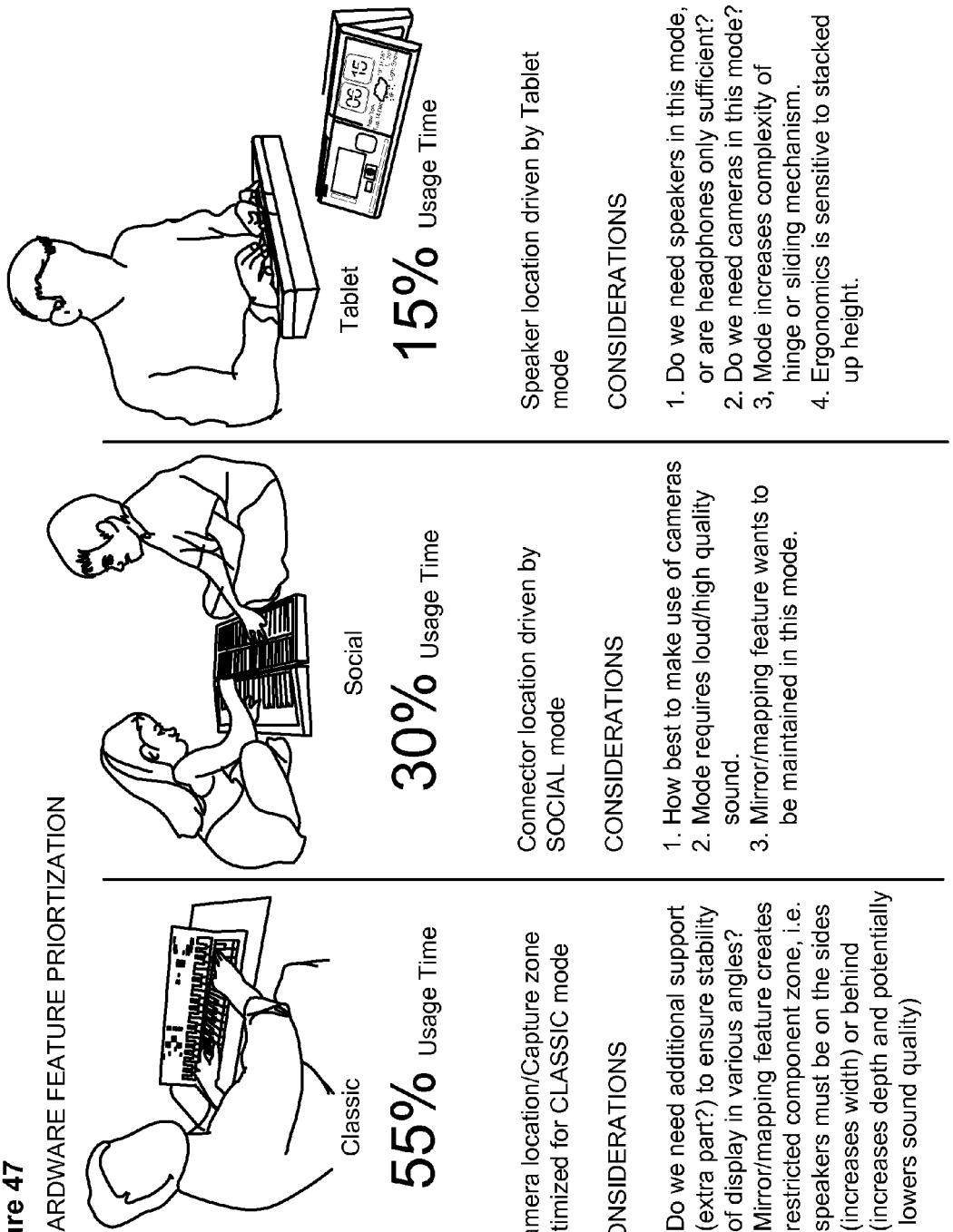
Figure 48:
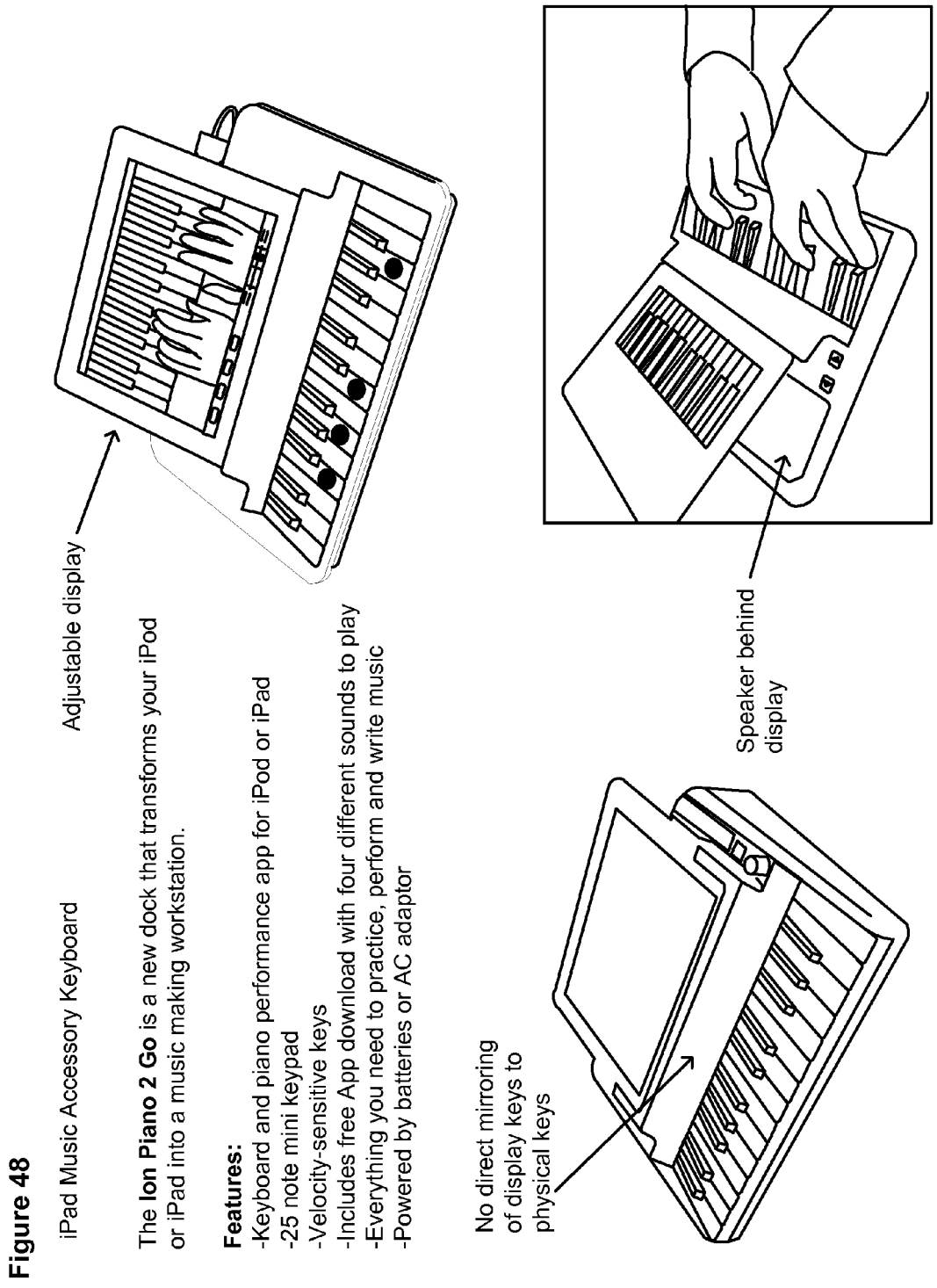

In a particular embodiment each note that is supposed to be played next is shown with an image that is positioned on the display screen. The display screen abuts next to or is adjacent to or otherwise in proximity to the piano keys. The display screen extends to substantially the full width of the piano keyboard so that an image cue to press a key can be shown immediately above the correct key to be played. In other embodiments, other keyboard/display arrangements are possible such as by having the display positioned below (i.e., between the user and the keyboard), using a projection display, not having the display run the full length of the keyboard, etc. Other variations are possible. See FIGS. 1-11. See, also, FIG. 12 showing the screen overlaying the keys for purposes of illustrating the correspondence of the graphics on the screen to the keys. The upper portion (A) of FIG. 12 shows a Traditional Learning Mode, which has the same learning functionality as GarageBand™ but improved overall user experience, with a multi-touch user interface and a cloud-based information display, such as tweets and Facebook™ updates from the user's own social graphs. The lower portion (B) of FIG. 12 shows an Interactive Learning or Game Mode, which has similar functionality as that of FingerPiano™ for IOS. However, using the Tempo Slider 1320 will help the user to slow down the learning pace, the multi-touch user interface helping the user to navigate the system easily while focusing on practice.

In a particular embodiment, the image cues move vertically from a point farther away from the keys to a point close to the keys and then disappear. When the image cue is at a point close to its respective key then that key is supposed to be pressed or played by the user. See FIGS. 1-11. See, also, FIG. 12 showing the screen overlaying the keys only for purposes of illustrating the correspondence of the graphics on the screen to the keys.

Another embodiment provides music visualization. When a key is pressed on the piano keyboard a visual effect takes place (1) in proximity to the key and (2) in association with the note (or tone) being played. For example, a particular visualization creates colored bubbles that emanate slowly from a point vertically in-line with the key being played. The characteristics of the bubbles can correspond to the characteristics of the note played. For example, the force and duration of the keypress can cause the bubbles to move more rapidly or to be larger, respectively. In a preferred embodiment, some characteristics of the visual image such as the color and starting position are always the same for a same key being played. In other embodiments many other variations are possible. Different shapes and animations can be used. The visualizations need not always match up with a given key.

In another embodiment, the piano keyboard computer can act as a controller for other musical devices. On-screen soft controllers on the piano keyboard computer's display screen can be used to control functions on other devices such as a music application running on another computer. Functions such as modulation, velocity and pitch bend can be assigned to a soft controller in the piano keyboard computer and controlled via a wired or wireless protocol (e.g., Bluetooth, wifi, etc.).

Another embodiment includes a docking area below the piano keys. This is a relatively open area so that additional hardware devices such as a speaker or speakers, hardware controllers (e.g., sliders, buttons, modulation wheel, etc.) can be placed on or attached to the piano keyboard computer. In one embodiment the added devices can electrically connect to the piano keyboard computer by hardwired connectors. In another embodiment the communication between the added devices and the piano keyboard computer can be by wireless protocol. See FIGS. 13-35.

Yet another embodiment provides a Software Development Toolkit (SDK) and Application Program Interface (API) that allows different systems and processes to communicate while also maintaining very low latency (i.e., fast response and processing times). Such low latency is often critical in music applications where small delays can affect the integrity of playing a performance or the art of creating a composition. Various functions of the SDK and API are shown including the use of callback routines to handle resource and processing requests. See FIGS. 36-40.

A further understanding of the nature and the advantages of particular embodiments disclosed herein may be realized by reference to the remaining portions of the specification and drawings. FIGS. 40-48 in particular illustrate various usage scenarios and corresponding system configurations.

Although the description has been described with respect to particular embodiments thereof, these particular embodiments are merely illustrative, and not restrictive of the invention, the scope of which is to be determined by the claims.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing a music tutorial, the method executing on a computer system including a display screen adjacent to a piano-type keyboard, the method comprising the following acts performed by one or more digital processors:
    playing back a musical composition;
    displaying an image cue on the display screen to prompt a user to press a key on the keyboard;
    determining if the prompted key has been pressed; and
    in response to the determining, displaying a visual effect on the display screen, wherein a first visual characteristic of the displayed visual effect is independent of any characteristic of the pressing other than the identity of the pressed key.

2. A method for providing a music visualization, the method executing on a computer system including a display screen adjacent to a piano-type keyboard, the method comprising the following acts performed by one or more digital processors:
    determining when a key on the piano-type keyboard has been pressed; and
    in response to the determining, displaying on the display screen a visualization associated with the pressed key, wherein the visualization is displayed in spatial association with the pressed key, and wherein a visual characteristic of the visualization is independent of any characteristic of the pressing other than the identity of the pressed key.

3. The method of claim 2, wherein the spatial association includes displaying the visualization above, and in vertical alignment with, the pressed key.

4. An apparatus comprising:
    a piano-type keyboard having a substantially flat top surface;
    a display screen adjacent to and above the keyboard;
    one or more processors coupled to the keyboard and to the display screen;
    a substantially flat area adjacent to and below the top surface of the keyboard for placing an additional device comprising at least one of an audio speaker and an audio controller; and
    a processor-readable storage device including one or more instructions executable by the processor for communicating with the additional device;
    wherein the additional device does not comprise the display screen.

5. The method of claim 1, wherein the visual effect is displayed in spatial association with the pressed key.

6. The method of claim 1, wherein a second visible characteristic of the visual effect is determined by an audible characteristic of the pressed key.

7. The method of claim 6, wherein one of the first visible characteristic and the second visible characteristic is uniquely associated with the pressed key.

8. The method of claim 6, wherein the audible characteristic of the pressed key comprises one of the force and duration of the pressure exerted by the user on the pressed key.

9. The method of claim 8, wherein the second visible characteristic comprises a rate of motion of the visual effect across the display screen.

10. The method of claim 2, wherein a second visible characteristic of the visual effect is determined by an audible characteristic of the pressed key.

11. The method of claim 10, wherein the second visible characteristic is uniquely associated with the pressed key.

12. The method of claim 10, wherein the audible characteristic of the pressed key comprises one of the force and duration of the pressure exerted by the user on the pressed key.

13. The method of claim 12, wherein the second visible characteristic comprises a rate of motion of the visual effect across the display screen.

14. The apparatus of claim 4, wherein the additional device comprises a speaker.

15. The apparatus of claim 4, wherein the additional device comprises a hardware controller.

\* \* \* \* \*